United States Patent
Bossen

(10) Patent No.: US 12,452,417 B2
(45) Date of Patent: Oct. 21, 2025

(54) SYSTEMS AND METHODS FOR PERFORMING INTRA PREDICTION CODING IN VIDEO CODING

(71) Applicant: Sharp Kabushiki Kaisha, Osaka (JP)

(72) Inventor: Frank Bossen, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/638,763

(22) Filed: Apr. 18, 2024

(65) Prior Publication Data

US 2024/0275964 A1 Aug. 15, 2024

Related U.S. Application Data

(63) Continuation of application No. 17/621,583, filed as application No. PCT/JP2020/024852 on Jun. 24, 2020, now Pat. No. 12,010,301.

(60) Provisional application No. 62/868,276, filed on Jun. 28, 2019, provisional application No. 62/865,661, filed on Jun. 24, 2019.

(51) Int. Cl.

| | |
|---|---|
| *H04N 19/117* | (2014.01) |
| *H04N 19/159* | (2014.01) |
| *H04N 19/176* | (2014.01) |
| *H04N 19/82* | (2014.01) |

(52) U.S. Cl.
CPC ......... *H04N 19/117* (2014.11); *H04N 19/159* (2014.11); *H04N 19/176* (2014.11); *H04N 19/82* (2014.11)

(58) Field of Classification Search
CPC .... H04N 19/82; H04N 19/176; H04N 19/159; H04N 19/117
See application file for complete search history.

(56) References Cited

U.S. PATENT DOCUMENTS

2021/0281835 A1* 9/2021 Filippov .............. H04N 19/176

OTHER PUBLICATIONS

Bossen, "Systems and Methods for Performing Intra Prediction Coding in Video Coding", U.S. Appl. No. 17/621,583, filed Dec. 21, 2021.
Filippov et al., "Non-CE3: On block size restrictions for PDPC", Joint Video Experts Team (JVET) of ITU-T SG 16 WP 3 and ISO/IEC JTC 1/SC 29/WG 11, JVET-M0122-v3, Jan. 9-18, 2019, 7 pages.
Bross et al., "Versatile Video Coding (Draft 3)", Joint Video Experts Team (JVET) of ITU-T SG 16 WP 3 and ISO/IEC JTC 1/SC 29/WG 11, JVET-L1001-v7, Oct. 3-12, 2018, 227 pages.

* cited by examiner

*Primary Examiner* — On S Mung
(74) *Attorney, Agent, or Firm* — Keating & Bennett, LLP

(57) ABSTRACT

This disclosure relates to video coding and more particularly to techniques for performing a position-dependent intra prediction sample filtering process. In one example, a method of coding video data comprises: deriving an intra prediction angle parameter; deriving an inverse angle parameter based on the intra prediction angle parameter; for a prediction mode included in a defined set of prediction modes, setting a value of a scale variable based on the derived inverse angle; and performing a position-dependent intra prediction sample filtering process using the value of a scale variable.

3 Claims, 8 Drawing Sheets

SYSTEMS AND METHODS FOR PERFORMING INTRA PREDICTION CODING IN VIDEO CODING

This application is a Continuation application of U.S. patent application Ser. No. 17/621,583 filed Dec. 21, 2021, currently pending.

TECHNICAL FIELD

This disclosure relates to video coding and more particularly to techniques for performing intra prediction.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards define the format of a compliant bitstream encapsulating coded video data. A compliant bitstream is a data structure that may be received and decoded by a video decoding device to generate reconstructed video data. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are working to standardized video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features that were under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software. Further, in response to a "Joint Call for Proposals on Video Compression with Capabilities beyond HEVC," jointly issued by VCEG and MPEG, multiple descriptions of video coding tools were proposed by various groups at the 10$^{th}$ Meeting of ISO/IEC JTC1/SC29/WG11 16-20 Apr. 2018, San Diego, CA. From the multiple descriptions of video coding tools, a resulting initial draft text of a video coding specification is described in "Versatile Video Coding (Draft 1)," 10$^{th}$ Meeting of ISO/IEC JTC1/SC29/WG11 16-20 Apr. 2018, San Diego, CA, document JVET-J1001-v2, which is incorporated by reference herein, and referred to as JVET-J1001. The current development of a next generation video coding standard by the VCEG and MPEG is referred to as the Versatile Video Coding (VVC) project. "Versatile Video Coding (Draft 5)," 14th Meeting of ISO/IEC JTC1/SC29/WG11 19-27 Mar. 2019, Geneva, CH, document JVET-N1001-v8, which is incorporated by reference herein, and referred to as JVET-N1001, represents the current iteration of the draft text of a video coding specification corresponding to the VVC project.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of pictures within a video sequence, a picture within a group of pictures, regions within a picture, sub-regions within regions, etc.). Intra prediction coding techniques (e.g., spatial prediction techniques within a picture) and inter prediction techniques (i.e., inter-picture techniques (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, and motion information). Residual data and syntax elements may be entropy coded. Entropy encoded residual data and syntax elements may be included in data structures forming a compliant bitstream

SUMMARY OF INVENTION

In one example, a method of coding video data, the method comprising: deriving an intra prediction angle parameter; deriving an inverse angle parameter based on the intra prediction angle parameter; for a prediction mode included in a defined set of prediction modes, setting a value of a scale variable based on the derived inverse angle; and performing a position-dependent intra prediction sample filtering process using the value of a scale variable.

In one example, a device comprising one or more processors configured to: derive an intra prediction angle parameter; derive an inverse angle parameter based on the intra prediction angle parameter; for a defined set of prediction modes, set a value of a scale variable based on the derived inverse angle; and perform a position-dependent intra prediction sample filtering process using the value of a scale variable.

DESCRIPTION OF EMBODIMENTS

Figure 1:
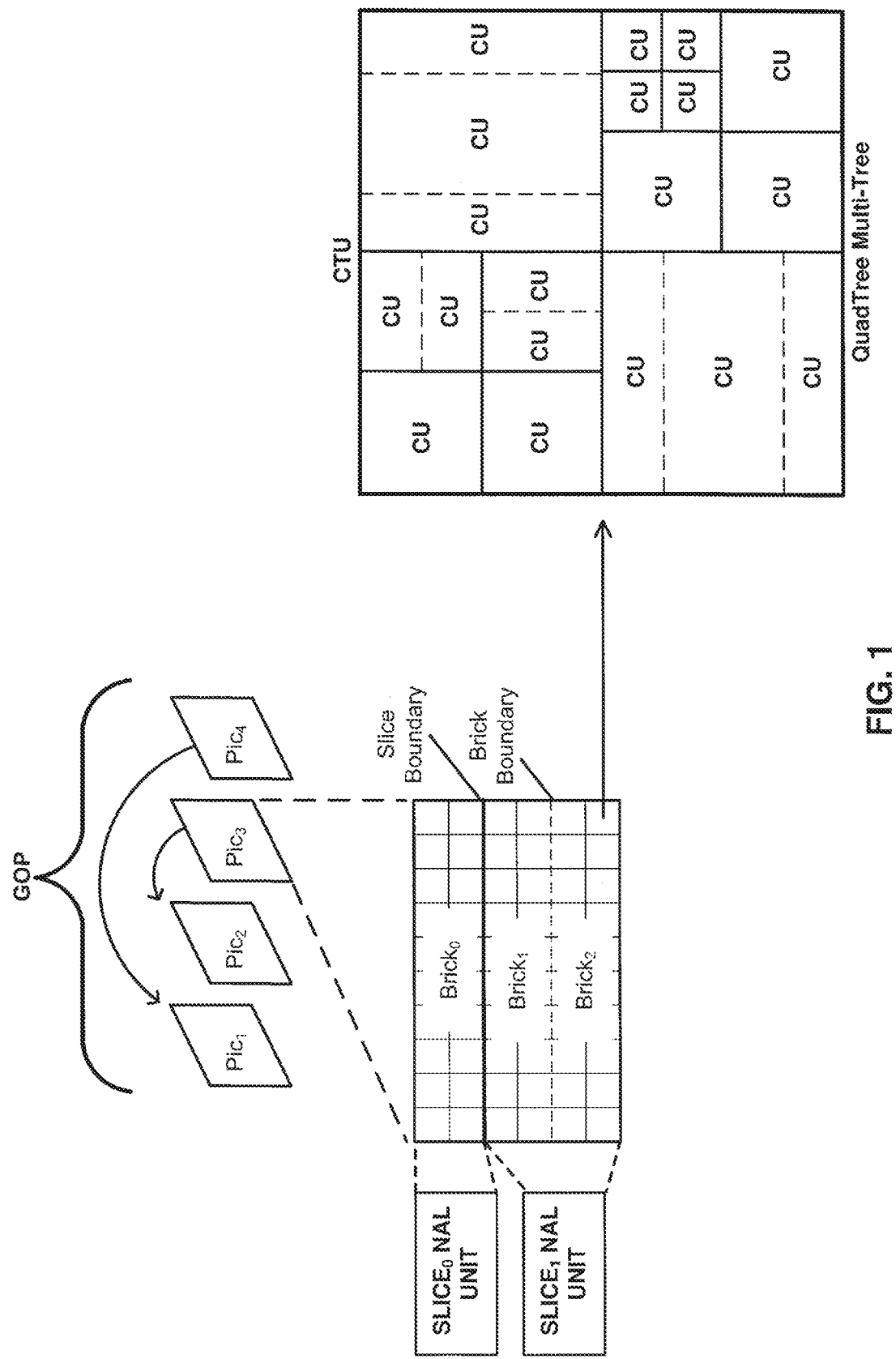
FIG. 1 is a conceptual diagram illustrating an example of a group of pictures coded according to a quad tree multi-tree partitioning in accordance with one or more techniques of this disclosure.

In general, this disclosure describes various techniques for coding video data. In particular, this disclosure describes techniques for performing intra prediction. It should be noted that although techniques of this disclosure are described with respect to ITU-T H.264, ITU-T H.265, JEM, and JVET-N1001 the techniques of this disclosure are generally applicable to video coding. For example, the coding techniques described herein may be incorporated into video coding systems, (including video coding systems based on future video coding standards) including video block structures, intra prediction techniques, inter prediction techniques, transform techniques, filtering techniques, and/or entropy coding techniques other than those included in ITU-T H.265, JEM, and JVET-N1001. Thus, reference to ITU-T H.264, ITU-T H.265, JEM, and/or JVET-N1001 is for descriptive purposes and should not be construed to limit the scope of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a method of coding of video data comprises setting a value of a scale variable based on an inverse angle provided by an intra prediction mode, and performing a position-dependent intra prediction sample filtering process based on the value of a scale variable.

In one example, a device for coding video data comprises one or more processors configured to set a value of a scale variable based on an inverse angle provided by an intra prediction mode, and perform a position-dependent intra prediction sample filtering process based on the value of a scale variable.

In one example, a non-transitory computer-readable storage medium comprises instructions stored thereon that, when executed, cause one or more processors of a device to set a value of a scale variable based on an inverse angle provided by an intra prediction mode, and perform a position-dependent intra prediction sample filtering process based on the value of a scale variable.

In one example, an apparatus comprises means for setting a value of a scale variable based on an inverse angle provided by an intra prediction mode, and means for performing a position-dependent intra prediction sample filtering process based on the value of a scale variable.

The details of one or more examples are set forth in the accompanying drawings and the description below. Other features, objects, and advantages will be apparent from the description and drawings, and from the claims.

Video content includes video sequences comprised of a series of frames (or pictures). A series of frames may also be referred to as a group of pictures (GOP). Each video frame or picture may divided into one or more regions. Regions may be defined according to a base unit (e.g., a video block) and sets of rules defining a region. For example, a rule defining a region may be that a region must be an integer number of video blocks arranged in a rectangle. Further, video blocks in a region may be ordered according to a scan pattern (e.g., a raster scan). As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values. It should be noted that in some cases pixel values may be described as including sample values for respective components of video data, which may also be referred to as color components, (e.g., luma (Y) and chroma (Cb and Cr) components or red, green, and blue components). It should be noted that in some cases, the terms pixel value and sample value are used interchangeably. Further, in some cases, a pixel or sample may be referred to as a pel. A video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions.

A video encoder may perform predictive encoding on video blocks and sub-divisions thereof. Video blocks and sub-divisions thereof may be referred to as nodes. ITU-T H.264 specifies a macroblock including 16×16 luma samples. That is, in ITU-T H.264, a picture is segmented into macroblocks. ITU-T H.265 specifies an analogous Coding Tree Unit (CTU) structure (which may be referred to as a largest coding unit (LCU)). In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr). It should be noted that video having one luma component and the two corresponding chroma components may be described as having two channels, i.e., a luma channel and a chroma channel. Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit (PU) structure having its root at the CU. In ITU-T H.265, PU structures allow luma and chroma CBs to be split for purposes of generating corresponding reference samples. That is, in ITU-T H.265, luma and chroma CBs may be split into respective luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs. In ITU-T H.265, in addition to the square PBs, rectangular PBs are supported for inter prediction, where a CB may by halved vertically or horizontally to form PBs. Further, it should be noted that in ITU-T H.265, for inter prediction, four asymmetric PB partitions are supported, where the CB is partitioned into two PBs at one quarter of the height (at the top or the bottom) or width (at the left or the right) of the CB. Intra prediction data (e.g., intra prediction mode syntax elements) or inter prediction data (e.g., motion data syntax elements) corresponding to a PB is used to produce reference and/or predicted sample values for the PB.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. In JVET-N1001, CTUs are partitioned according a quadtree plus multi-type tree (QTMT or QT+MTT) structure. The QTMT in JVET-N1001 is similar to the QTBT in JEM. However, in JVET-N1001, in addition to indicating binary splits, the multi-type tree may indicate so-called ternary (or triple tree (TT)) splits. A ternary split divides a block vertically or horizontally into three blocks. In the case of a vertical TT split, a block is divided at one quarter of its width from the left edge and at one quarter its width from the right edge and in the case of a horizontal TT split a block is at one quarter of its height from the top edge and at one quarter of its height from the bottom edge. Referring again to FIG. 1, FIG. 1 illustrates an example of a CTU being partitioned into quadtree leaf nodes and quadtree leaf nodes being further partitioned according to a BT split or a TT split. That is, in FIG. 1 dashed lines indicate additional binary and ternary splits in a quadtree.

As described above, each video frame or picture may divided into one or more regions. For example, according to ITU-T H.265, each video frame or picture may be partitioned to include one or more slices and further partitioned to include one or more tiles, where each slice includes a sequence of CTUs (e.g., in raster scan order) and where a tile is a sequence of CTUs corresponding to a rectangular area of a picture. It should be noted that a slice, in ITU-T H.265, is a sequence of one or more slice segments starting with an independent slice segment and containing all subsequent dependent slice segments (if any) that precede the next independent slice segment (if any). A slice segment, like a slice, is a sequence of CTUs. Thus, in some cases, the terms slice and slice segment may be used interchangeably to indicate a sequence of CTUs arranged in a raster scan order. Further, it should be noted that in ITU-T H.265, a tile may consist of CTUs contained in more than one slice and a slice may consist of CTUs contained in more than one tile. However, ITU-T H.265 provides that one or both of the following conditions shall be fulfilled: (1) All CTUs in a slice belong to the same tile; and (2) All CTUs in a tile belong to the same slice.

With respect to JVET-N1001, slices are required to consist of an integer number of bricks instead of only being required to consist of an integer number of CTUs. In JVET-N1001, a brick is a rectangular region of CTU rows within a particular tile in a picture. Further, in JVET-N1001, a tile may be partitioned into multiple bricks, each of which consisting of one or more CTU rows within the tile. A tile that is not partitioned into multiple bricks is also referred to as a brick. However, a brick that is a true subset of a tile is not referred to as a tile. As such, a slice including a set of CTUs which do not form a rectangular region of a picture may or may not be supported in some video coding techniques. Further, it should be noted that in some cases, a slice may be required to consist of an integer number of complete tiles and in this case is referred to as a tile group. The techniques described herein may applicable to bricks, slices, tiles, and/or tile groups. FIG. 1 is a conceptual diagram illustrating an example of a group of pictures including slices. In the example illustrated in FIG. 1, $Pic_3$ is illustrated as including two slices (i.e., $Slice_0$ and $Slice_1$). In the example illustrated in FIG. 1, $Slice_0$ includes one brick, i.e., $Brick_0$ and $Slice_1$ includes two bricks, i.e., $Brick_1$ and $Brick_2$. It should be noted that in some cases, $Slice_0$ and $Slice_1$ may meet the requirements of and be classified as tiles and/or tile groups.

Figure 3:
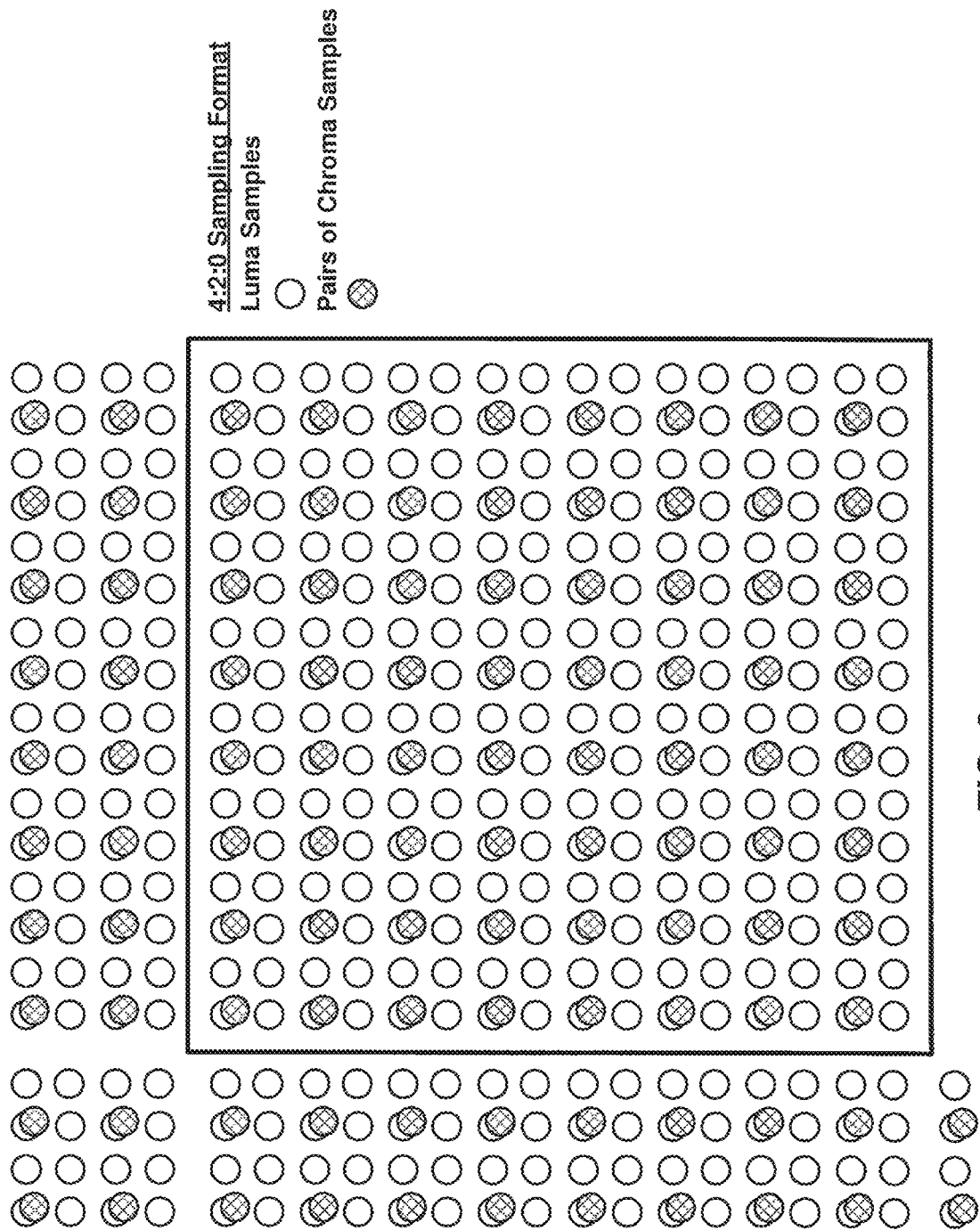
FIG. 3 is a conceptual diagram illustrating an example of a video component sampling format that may be utilized in accordance with one or more techniques of this disclosure.

A video sampling format, which may also be referred to as a chroma format, may define the number of chroma samples included in a CU with respect to the number of luma samples included in a CU. For example, for the 4:2:0 sampling format, the sampling rate for the luma component is twice that of the chroma components for both the horizontal and vertical directions. As a result, for a CU formatted according to the 4:2:0 format, the width and height of an array of samples for the luma component are twice that of each array of samples for the chroma components. FIG. 3 is a conceptual diagram illustrating an example of a coding unit formatted according to a 4:2:0 sample format. FIG. 3 illustrates the relative position of chroma samples with respect to luma samples within a CU. As described above, a CU is typically defined according to the number of horizontal and vertical luma samples. Thus, as illustrated in FIG. 3, a 16×16 CU formatted according to the 4:2:0 sample format includes 16×16 samples of luma components and 8×8 samples for each chroma component. Further, in the example illustrated in FIG. 3, the relative position of chroma samples with respect to luma samples for video blocks neighboring the 16×16 CU are illustrated. For a CU formatted according to the 4:2:2 format, the width of an array of samples for the luma component is twice that of the width of an array of samples for each chroma component, but the height of the array of samples for the luma component is equal to the height of an array of samples for each chroma component. Further, for a CU formatted according to the 4:4:4 format, an array of samples for the luma component has the same width and height as an array of samples for each chroma component.

For intra prediction coding, an intra prediction mode may specify the location of reference samples within a picture. In ITU-T H.265, defined possible intra prediction modes include a planar (i.e., surface fitting) prediction mode, a DC (i.e., flat overall averaging) prediction mode, and 33 angular prediction modes (predMode: 2-34). In JEM, defined possible intra-prediction modes include a planar prediction mode, a DC prediction mode, and 65 angular prediction modes. It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a reference picture is determined and a motion vector (MV) identifies samples in the reference picture that are used to generate a prediction for a current video block. For example, a current video block may be predicted using reference sample values located in one or more previously coded picture(s) and a motion vector is used to indicate the location of the reference block relative to the current video block. A motion vector may describe, for example, a horizontal displacement component of the motion vector (i.e., $MV_x$), a vertical displacement component of the motion vector (i.e., $MV_y$), and a resolution for the motion vector (e.g., one-quarter pixel precision, one-half pixel precision, one-pixel precision, two-pixel precision, four-pixel precision). Previously decoded pictures, which may include pictures output before or after a current picture, may be organized into one or more to reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture and corresponding motion vector are used to generate a prediction for a current video block and in bi-prediction, a first reference picture and corresponding first motion vector and a second reference picture and corresponding second motion vector are used to generate a prediction for a current video block. In bi-prediction, respective sample values are combined (e.g., added, rounded, and clipped, or averaged according to weights) to generate a prediction. Pictures and regions thereof may be classified based on which types of prediction modes may be utilized for encoding video blocks thereof. That is, for regions having a B type (e.g., a B slice), bi-prediction, uni-prediction, and intra prediction modes may be utilized, for regions having a P type (e.g., a P slice), uni-prediction, and intra prediction modes may be utilized, and for regions having an I type (e.g., an I slice), only intra prediction modes may be utilized. As described above, reference pictures are identified through reference indices. For example, for a P slice, there may be a single reference picture list, RefPicList0 and for a B slice, there may be a second independent reference picture list, RefPicList1, in addition to RefPicList0. It should be noted that for uni-prediction in a B slice, one of RefPicList0 or RefPicList1 may be used to generate a prediction. Further, it should be noted that during the decoding process, at the onset of decoding a picture, reference picture list(s) are generated from previously decoded pictures stored in a decoded picture buffer (DPB).

Further, a coding standard may support various modes of motion vector prediction. Motion vector prediction enables the value of a motion vector for a current video block to be derived based on another motion vector. For example, a set of candidate blocks having associated motion information may be derived from spatial neighboring blocks and temporal neighboring blocks to the current video block. Further, generated (or default) motion information may be used for motion vector prediction. Examples of motion vector prediction include advanced motion vector prediction (AMVP), temporal motion vector prediction (TMVP), so-called "merge" mode, and "skip" and "direct" motion inference. Further, other examples of motion vector prediction include advanced temporal motion vector prediction (ATMVP) and Spatial-temporal motion vector prediction (STMVP). For motion vector prediction, both a video encoder and video decoder perform the same process to derive a set of candidates. Thus, for a current video block, the same set of candidates is generated during encoding and decoding.

As described above, for inter prediction coding, reference samples in a previously coded picture are used for coding video blocks in a current picture. Previously coded pictures which are available for use as reference when coding a current picture are referred as reference pictures. It should be noted that the decoding order does not necessary correspond with the picture output order, i.e., the temporal order of pictures in a video sequence. In ITU-T H.265, when a picture is decoded it is stored to a decoded picture buffer (DPB) (which may be referred to as frame buffer, a reference buffer, a reference picture buffer, or the like). In ITU-T H.265, pictures stored to the DPB are removed from the DPB when they been output and are no longer needed for coding subsequent pictures. In ITU-T H.265, a determination of whether pictures should be removed from the DPB is invoked once per picture, after decoding a slice header, i.e., at the onset of decoding a picture. For example, referring to FIG. 1, $Pic_3$ is illustrated as referencing $Pic_2$. Similarly, Pica is illustrated as referencing $Pic_1$. With respect to FIG. 1 assuming the picture number corresponds to the decoding order the DPB would be populated as follows: after decoding $Pic_1$, the DPB would include $\{Pic_1\}$; at the onset of decoding $Pic_2$, the DPB would include $\{Pic_1\}$; after decoding $Pic_2$, the DPB would include $\{Pic_1, Pic_2\}$; at the onset of decoding $Pic_3$, the DPB would include $\{Pic_1, Pic_2\}$. $Pic_3$ would then be decoded with reference to $Pic_2$ and after decoding $Pic_3$, the DPB would include $\{Pic_1, Pic_2, Pic_3\}$. At the onset of decoding Pica, pictures $Pic_2$ and $Pic_3$ would be marked for removal from the DPB, as they are not needed for decoding Pica (or any subsequent pictures, not shown) and assuming $Pic_2$ and $Pic_3$ have been output, the DPB would be updated to include $\{Pic_1\}$. Pica would then be decoded with referencing $Pic_1$. The process of marking pictures for removal from a DPB may be referred to as reference picture set (RPS) management.

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265 and JVET-N1001, a CU is associated with a transform unit (TU) structure having its root at the CU level. That is, an array of difference values may be partitioned for purposes of generating transform coefficients (e.g., four 8×8 transforms may be applied to a 16×16 array of residual values). For each component of video data, such sub-divisions of difference values may be referred to as Transform Blocks (TBs). It should be noted that in some cases, a core transform and a subsequent secondary transforms may be applied (in the video encoder) to generate transform coefficients. For a video decoder, the order of transforms is reversed.

A quantization process may be performed on transform coefficients or residual sample values directly (e.g., in the case, of palette coding quantization). Quantization approximates transform coefficients by amplitudes restricted to a set of specified values. Quantization essentially scales transform coefficients in order to vary the amount of data required to represent a group of transform coefficients. Quantization may include division of transform coefficients (or values resulting from the addition of an offset value to transform coefficients) by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor, and any reciprocal rounding or offset addition operations. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases. Further, it should be noted that although in some of the examples below quantization processes are described with respect to arithmetic operations associated with decimal notation, such descriptions are for illustrative purposes and should not be construed as limiting. For example, the techniques described herein may be implemented in a device using binary operations and the like. For example, multiplication and division operations described herein may be implemented using bit shifting operations and the like.

Quantized transform coefficients and syntax elements (e.g., syntax elements indicating a coding structure for a video block) may be entropy coded according to an entropy coding technique. An entropy coding process includes coding values of syntax elements using lossless data compression algorithms. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process, for example, CABAC, may include performing a binarization on syntax elements. Binarization refers to the process of converting a value of a syntax element into a series of one or more bits. These bits may be referred to as "bins." Binarization may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard. In the example of CABAC, for a particular bin, a context provides a most probable state (MPS) value for the bin (i.e., an MPS for a bin is one of 0 or 1) and a probability value of the bin being the MPS or the least probably state (LPS). For example, a context may indicate, that the MPS of a bin is 0 and the probability of the bin being 1 is 0.3. It should be noted that a context may be determined based on values of previously coded bins including bins in the current syntax element and previously coded syntax elements. For example, values of syntax elements associated with neighboring video blocks may be used to determine a context for a current bin.

With respect to the equations used herein, the following arithmetic operators may be used:

+ Addition
− Subtraction
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.
x/y Used to denote division in mathematical equations where no truncation or rounding is intended.
x % y Modulus. Remainder of x divided by y, defined only for integers x and y with x>=0 and y>0.

Further, the following logical operators may be used:
x && y Boolean logical "and" or x and y
x||y Boolean logical "or" of x and y
! Boolean logical "not"
x?y:z If x is TRUE or not equal to 0, evaluates to the value of y; otherwise, evaluates to the value of z.

Further, the following relational operators may be used:
> Greater than
>= Greater than or equal to
< Less than
<= Less than or equal to
=== Equal to
!= Not equal to Further, the following bit-wise operators may be used:
& Bit-wise "and". When operating on integer arguments, operates on a two's complement representation of the integer value. When operating on a binary argument that contains fewer bits than another argument, the shorter argument is extended by adding more significant bits equal to 0.
| Bit-wise "or". When operating on integer arguments, operates on a two's complement representation of the integer value. When operating on a binary argument that contains fewer bits than another argument, the shorter argument is extended by adding more significant bits equal to 0.
^ Bit-wise "exclusive or". When operating on integer arguments, operates on a two's complement representation of the integer value. When operating on a binary argument that contains fewer bits than another argument, the shorter argument is extended by adding more significant bits equal to 0.
x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.
x<<y Arithmetic left shift of a two's complement integer representation of x by y binary digits. This function is defined only for non-negative integer values of y. Bits shifted into the least significant bits (LSBs) as a result of the left shift have a value equal to 0.

Further, the following assignment operators may be used:
= Assignment operator
++ Increment, i.e., x++ is equivalent to x=x+1; when used in an array index, evaluates to the value of the variable prior to the increment operation.

— Decrement, i.e., x-- is equivalent to x=x−1; when used in an array index, evaluates to the value of the variable prior to the decrement operation.
+= Increment by amount specified, i.e., x+=3 is equivalent to x=x+3, and x+=(−3) is equivalent to x=x+(−3).
−= Decrement by amount specified, i.e., x−=3 is equivalent to x=x−3, and x−=(−3) is equivalent to x=x−(−3).

Further, the following defined mathematical functions may be used:

$$Abs(x) = \begin{cases} x; & x >= 0 \\ -x; & x < 0 \end{cases}$$

Floor(x) the largest integer less than or equal to x.
Log 2(x) the base-2 logarithm of x.

$$Min(x, y) = \begin{cases} x; & x <= y \\ y; & x > y \end{cases}$$

$$Max(x, y) = \begin{cases} x; & x >= y \\ y; & x < y \end{cases}$$

$$Round(x) = Sign(x) * Floor(Abs(x) + 0.5)$$

$$Sign(x) = \begin{cases} 1; & x > 0 \\ 0; & x == 0 \\ -1; & x < 0 \end{cases}$$

Further, it should be noted that in the syntax descriptors used herein, the following descriptors may be applied:
  b(8): byte having any pattern of bit string (8 bits). The parsing process for this descriptor is specified by the return value of the function read_bits(8).
  f(n): fixed-pattern bit string using n bits written (from left to right) with the left bit first. The parsing process for this descriptor is specified by the return value of the function read_bits(n).
  se(v): signed integer 0-th order Exp-Golomb-coded syntax element with the left bit first.
  tb(v): truncated binary using up to maxVal bits with maxVal defined in the semantics of the syntax element.
  tu(v): truncated unary using up to maxVal bits with maxVal defined in the semantics of the syntax element.
  u(n): unsigned integer using n bits. When n is "v" in the syntax table, the number of bits varies in a manner dependent on the value of other syntax elements. The parsing process for this descriptor is specified by the return value of the function read_bits(n) interpreted as a binary representation of an unsigned integer with most significant bit written first.
  ue(v): unsigned integer 0-th order Exp-Golomb-coded syntax element with the left bit first.

Figure 2A:
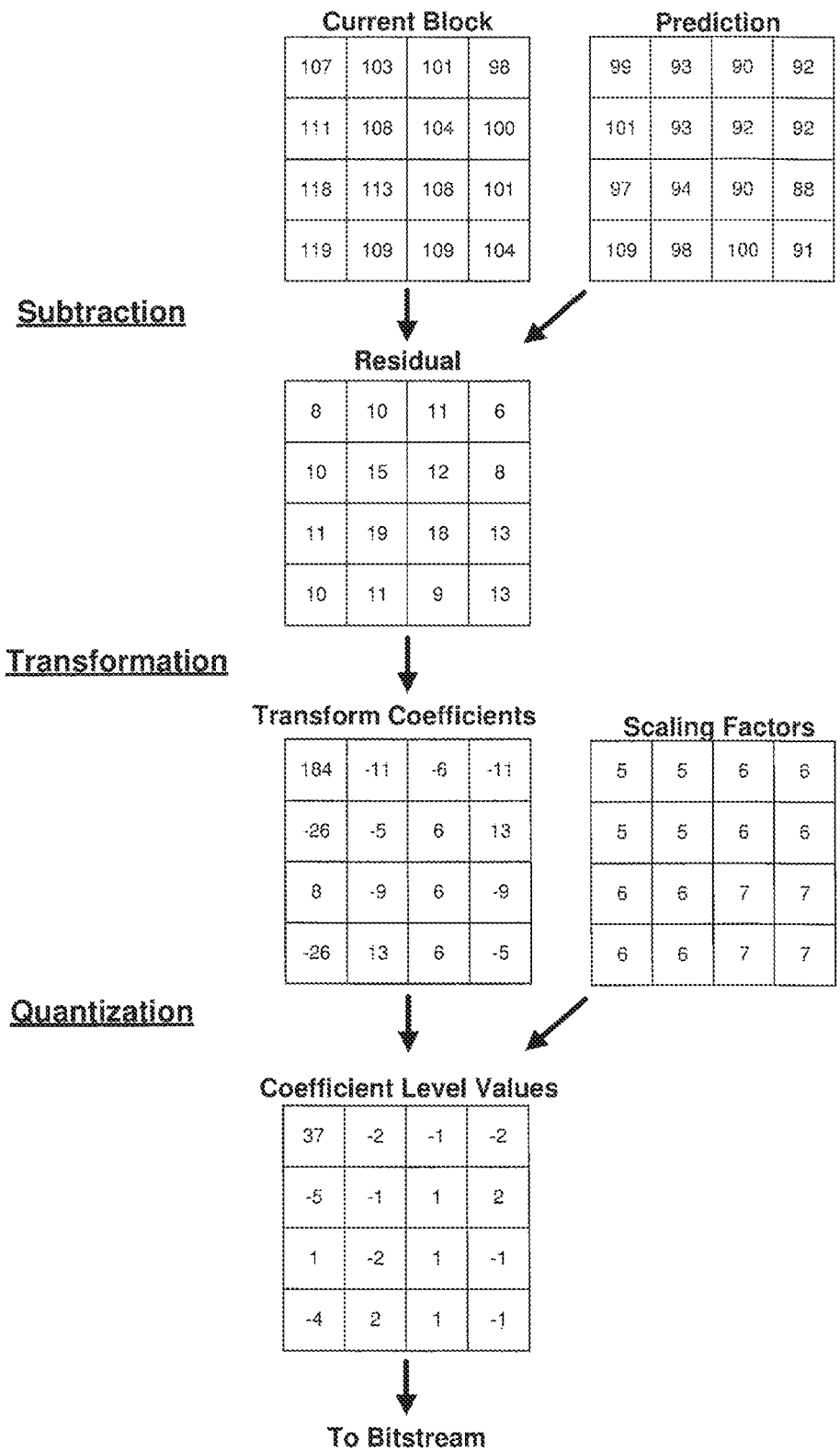
FIG. 2A is a conceptual diagram illustrating example of coding a block of video data in accordance with one or more techniques of this disclosure.
Figure 2B:
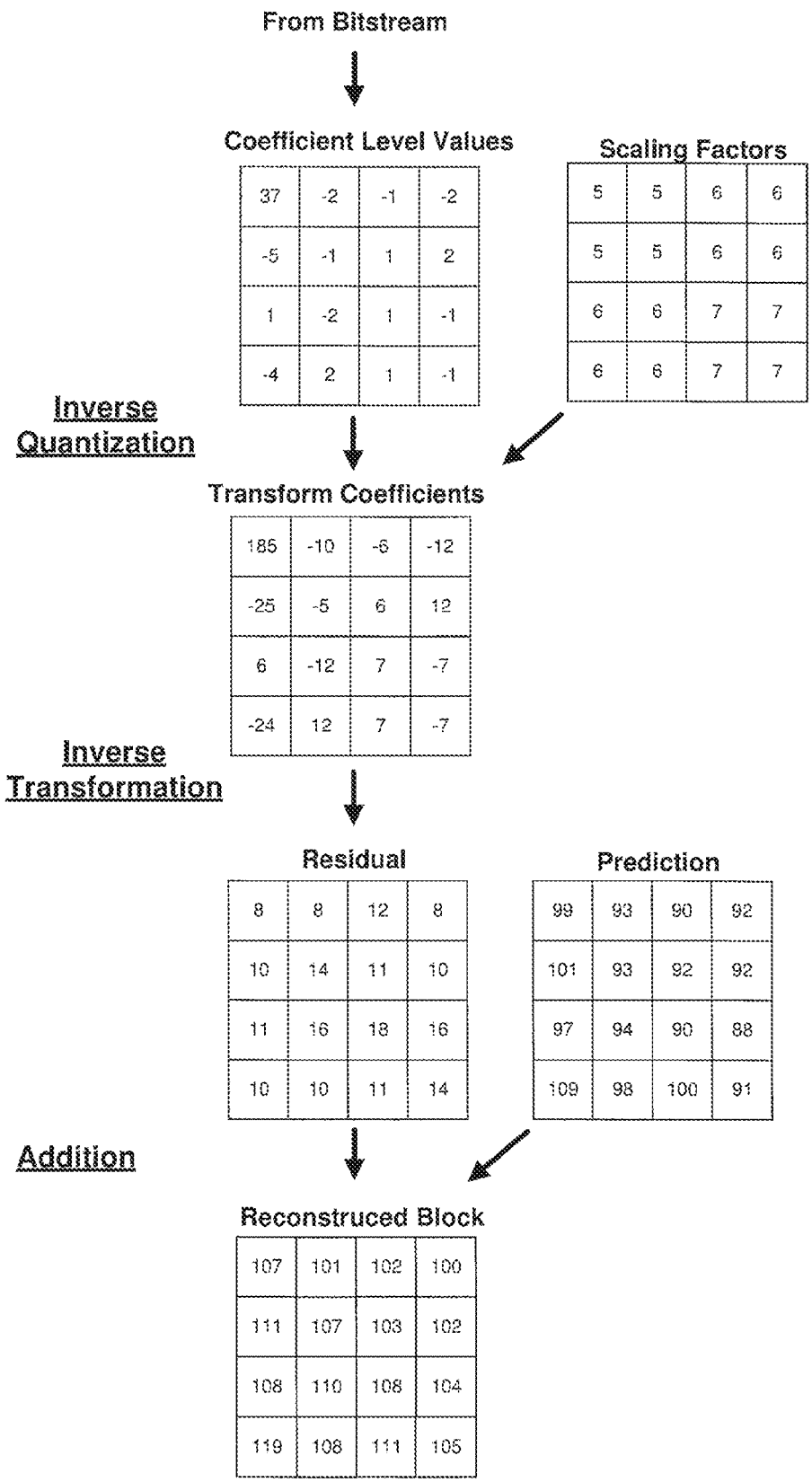
FIG. 2B is a conceptual diagram illustrating example of coding a block of video data in accordance with one or more techniques of this disclosure.

FIGS. 2A-2B are conceptual diagrams illustrating examples of coding a block of video data. As illustrated in FIG. 2A, a current block of video data (e.g., a CB corresponding to a video component) is encoded by generating a residual by subtracting a set of prediction values from the current block of video data, performing a transformation on the residual, and quantizing the transform coefficients to generate level values. The level values are coded into a bitstream. As illustrated in FIG. 2B, the current block of video data is decoded by performing inverse quantization on level values, performing an inverse transform, and adding a set of prediction values to the resulting residual. It should be noted that in the examples in FIGS. 2A-2B, the sample values of the reconstructed block differs from the sample values of the current video block that is encoded. In this manner, coding may said to be lossy. However, the difference in sample values may be considered acceptable or imperceptible to a viewer of the reconstructed video.

Further, as illustrated in FIGS. 2A-2B, coefficient level values are generated using an array of scaling factors. In ITU-T H.265, an array of scaling factors is generated by selecting a scaling matrix and multiplying each entry in the scaling matrix by a quantization scaling factor. A scaling matrix may be selected based in part on a prediction mode and a color component. It should be noted that in some examples, a scaling matrix may provide the same value for each entry (i.e., all coefficients are scaled according to a single value). The value of a quantization scaling factor, may be determined by a quantization parameter, QP. Further, a QP value for a set of transform coefficients may be derived using a predictive quantization parameter value (which may be referred to as a predictive QP value or a QP predictive value) and an optionally signaled quantization parameter delta value (which may be referred to as a QP delta value or a delta QP value). A quantization parameter may be updated for each CU and a respective quantization parameter may be derived for each of the luma and chroma channels.

Figure 4:
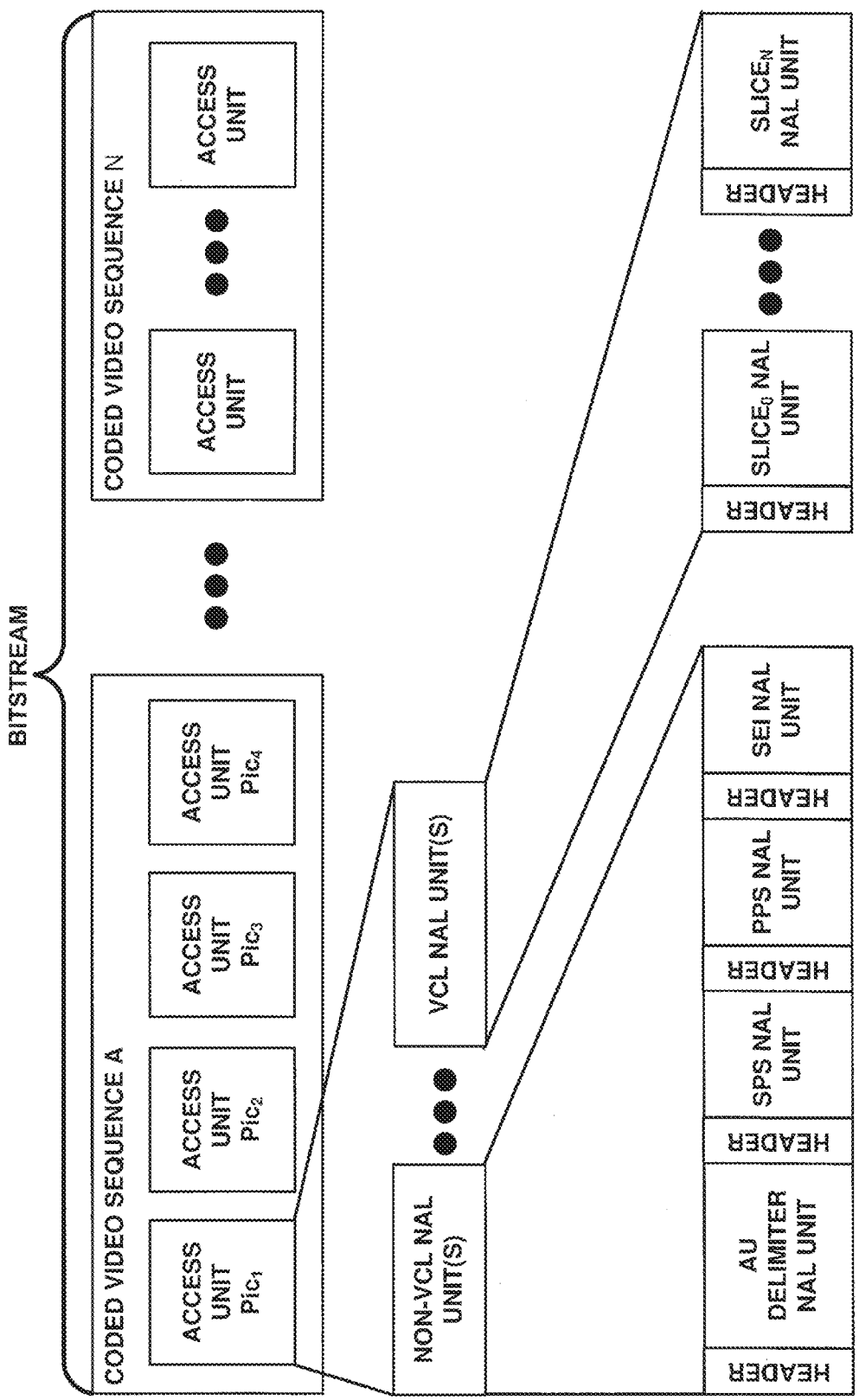
FIG. 4 is a conceptual diagram illustrating a data structure encapsulating coded video data and corresponding metadata according to one or more techniques of this this disclosure.

Referring to the example illustrated in FIG. 1, each slice of video data included in Pic$_3$ (i.e., Slice$_0$ and Slice$_1$) is illustrated as being encapsulated in a NAL unit. In JVET-N1001, each of a video sequence, a GOP, a picture, a slice, and CTU may be associated with metadata that describes video coding properties. JVET-N1001 defines parameters sets that may be used to describe video data and/or video coding properties. In particular, JVET-N1001 includes the following five types of parameter sets: decoding parameter set (DPS), video parameter set (VPS), sequence parameter set (SPS), picture parameter set (PPS), and adaption parameter set (APS). In JVET-N1001, parameter sets may be encapsulated as a special type of NAL unit or may be signaled as a message. NAL units including coded video data (e.g., a slice) may be referred to as VCL (Video Coding Layer) NAL units and NAL units including metadata (e.g., parameter sets) may be referred to as non-VCL NAL units. Further, JVET-N1001 enables supplemental enhancement information (SEI) messages to be signaled. In JVET-N1001, SEI messages assist in processes related to decoding, display or other purposes, however, SEI messages may not be required for constructing the luma or chroma samples by the decoding process. In JVET-N1001, SEI messages may be signaled in a bitstream using non-VCL NAL units. Further, SEI messages may be conveyed by some means other than by being present in the bitstream (i.e., signaled out-of-band). FIG. 4 illustrates an example of a bitstream including multiple CVSs, where a CVS is represented by NAL units included in a respective access unit. In the example illustrated in FIG. 4, non-VCL NAL units include respective parameter set NAL units (i.e., Sequence Parameter Sets (SPS), and Picture Parameter Set (PPS) NAL units), an SEI message NAL unit, and an access unit delimiter NAL unit. It should be noted that in FIG. 4, HEADER is a NAL unit header.

As described above, intra prediction data may indicate how a prediction is generated for a current video block. That is, intra prediction data indicates how an array of prediction sample values, e.g., predSamples[x][y] is generated. It should be noted that the generation of an array of prediction samples may include one or more of padding (i.e., replicating a sample value), projection (i.e., mapping an angular direction to a particular sample, and/or interpolating a sample value from an angular prediction); and smoothing and/or filtering prediction sample values. In JVET-N1001, defined possible intra-prediction modes for luma include a planar prediction mode (predMode: 0), a DC prediction mode (predMode: 1), and 93 directional prediction modes (predMode: −14 to −1 and 2 to 80), including 28 wide-angle modes that are only applied to non-square blocks. JVET-N1001 specifies the following for deriving an array of prediction samples, predSamples[x][y] from directional prediction modes:

Direction Intra Prediction Mode Process

Inputs to this process are:

the intra prediction mode predModeIntra, a variable refIdx specifying the intra prediction reference line index, a variable nTbW specifying the transform block width, a variable nTbH specifying the transform block height, a variable refW specifying the reference samples width, a variable refH specifying the reference samples height, a variable nCbW specifying the coding block width, a variable nCbH specifying the coding block height.

a variable refFilterFlag specifying the value of reference filter flag, a variable cIdx specifying the colour component of the current block, the neighbouring samples p[x][y], with x=−1−refIdx, y=−1−refIdx . . . refH−1 and x=−refIdx . . . refW−1, y=−1−refIdx.

Outputs of this process are the predicted samples predSamples[x][y], with x=0 . . . nTbW−1, y=0 . . . nTbH−1.

The variable nTbS is set equal to (Log 2(nTbW)+Log 2(nTbH))>>1.

The variable filterFlag is derived as follows:

If one or more of the following conditions is true, filterFlag is set equal to 0.

refFilterFlag is equal to 1 refIdx is not equal to 0

IntraSubPartitionsSplitType is not equal to ISP_NO_SPLIT and predModeIntra is greater than or equal to INTRA_ANGULAR34 and nTbW is less than or equal to 8

IntraSubPartitionsSplitType is not equal to ISP_NO_SPLIT and predModeIntra is less than INTRA_ANGULAR34 and nTbH is less than or equal to 8.

Otherwise, the following applies:

The variable minDistVerHor is set equal to Min(Abs (predModeIntra−50). Abs(predModeIntra−18)).

The variable intraHorVerDistThres[nTbS] is specified in Table 1

The variable filterFlag is derived as follows:

If one or more of the following conditions is true, filterFlag is set equal to 1:

IntraSubPartitionsSplitType is not equal to ISP_NO_SPLIT minDistVerHor is greater than intraHorVerDistThres[nTbS] and refFilterFlag is equal to 0

Otherwise, filterFlag is set equal to 0.

TABLE 1

|  | nTbS = 2 | nTbS = 3 | nTbS = 4 | nTbS = 5 | nTbS = 6 | nTbS = 7 |
|---|---|---|---|---|---|---|
| intraHorVerDistThres[ nTbS ] | 16 | 14 | 2 | 0 | 0 | 0 |

Table 2 specifies the mapping table between a predModeIntra and the angle parameter intraPredAngle.

TABLE 2

| predModeIntra | −14 | −13 | −12 | −11 | −10 | −9 | −8 | −7 | −6 | −5 | −4 | −3 | −2 | −1 | 2 | 3 | 4 |
|---|---|---|---|---|---|---|---|---|---|---|---|---|---|---|---|---|---|
| intraPredAngle | 512 | 341 | 256 | 171 | 128 | 102 | 86 | 73 | 64 | 57 | 51 | 45 | 39 | 35 | 32 | 29 | 26 |
| predModeIntra | 5 | 6 | 7 | 8 | 9 | 10 | 11 | 12 | 13 | 14 | 15 | 16 | 17 | 18 | 19 | 20 | 21 |
| intraPredAngle | 23 | 20 | 18 | 16 | 14 | 12 | 10 | 8 | 6 | 4 | 3 | 2 | 1 | 0 | −1 | −2 | −3 |
| predModeIntra | 22 | 23 | 24 | 25 | 26 | 27 | 28 | 29 | 30 | 31 | 32 | 33 | 34 | 35 | 36 | 37 | 38 |
| intraPredAngle | −4 | −6 | −8 | −10 | −12 | −14 | −16 | −18 | −20 | −23 | −26 | −29 | −32 | −29 | −26 | −23 | −20 |
| predModeIntra | 39 | 40 | 41 | 42 | 43 | 44 | 45 | 46 | 47 | 48 | 49 | 50 | 51 | 52 | 53 | 54 | 55 |
| intraPredAngle | −18 | −16 | −14 | −12 | −10 | −8 | −6 | −4 | −3 | −2 | −1 | 0 | 1 | 2 | 3 | 4 | 6 |
| predModeIntra | 56 | 57 | 58 | 59 | 60 | 61 | 62 | 63 | 64 | 65 | 66 | 67 | 68 | 69 | 70 | 71 | 72 |
| intraPredAngle | 8 | 10 | 12 | 14 | 16 | 18 | 20 | 23 | 26 | 29 | 32 | 35 | 39 | 45 | 51 | 57 | 64 |
| predModeIntra | 73 | 74 | 75 | 76 | 77 | 78 | 79 | 80 |  |  |  |  |  |  |  |  |  |
| intraPredAngle | 73 | 86 | 102 | 128 | 171 | 256 | 341 | 512 |  |  |  |  |  |  |  |  |  |

The inverse angle parameter invAngle is derived based on intraPredAngle as follows:

$$invAngle = \text{Round}\left(\frac{256 * 32}{intraPredAngle}\right)$$

The interpolation filter coefficients fC[phase][j] and fG[phase][j] with phase=0 ... 31 and j=0 ... 3 specified in Table 3.

TABLE 3

| Fractional sample position p | fC interpolation filter coefficients | | | | fG interpolation filter coefficients | | | |
|---|---|---|---|---|---|---|---|---|
| | fc[p][0] | fc[p][1] | fc[p][2] | fc[p][3] | fG[p][0] | fG[p][1] | fG[p][2] | fG[p][3] |
| 0 | 0 | 64 | 0 | 0 | 16 | 32 | 16 | 0 |
| 1 | −1 | 63 | 2 | 0 | 15 | 29 | 17 | 3 |
| 2 | −2 | 62 | 4 | 0 | 15 | 29 | 17 | 3 |
| 3 | −2 | 60 | 7 | −1 | 14 | 29 | 18 | 3 |
| 4 | −2 | 58 | 10 | −2 | 13 | 29 | 18 | 4 |
| 5 | −3 | 57 | 12 | −2 | 13 | 28 | 19 | 4 |
| 6 | −4 | 56 | 14 | −2 | 13 | 28 | 19 | 4 |
| 7 | −4 | 55 | 15 | −2 | 12 | 28 | 20 | 4 |
| 8 | −4 | 54 | 16 | −2 | 11 | 28 | 20 | 5 |
| 9 | −5 | 53 | 18 | −2 | 11 | 27 | 21 | 5 |
| 10 | −6 | 52 | 20 | −2 | 10 | 27 | 22 | 5 |
| 11 | −6 | 49 | 24 | −3 | 9 | 27 | 22 | 6 |
| 12 | −6 | 46 | 28 | −4 | 9 | 26 | 23 | 6 |
| 13 | −5 | 44 | 29 | −4 | 9 | 26 | 23 | 6 |
| 14 | −4 | 42 | 30 | −4 | 8 | 25 | 24 | 7 |
| 15 | −4 | 39 | 33 | −4 | 8 | 25 | 24 | 7 |
| 16 | −4 | 36 | 36 | −4 | 8 | 24 | 24 | 8 |
| 17 | −4 | 33 | 39 | −4 | 7 | 24 | 25 | 8 |
| 18 | −4 | 30 | 42 | −4 | 7 | 24 | 25 | 8 |
| 19 | −4 | 29 | 44 | −5 | 6 | 23 | 26 | 9 |
| 20 | −4 | 28 | 46 | −6 | 6 | 23 | 26 | 9 |
| 21 | −3 | 24 | 49 | −6 | 6 | 22 | 27 | 9 |
| 22 | −2 | 20 | 52 | −6 | 5 | 22 | 27 | 10 |
| 23 | −2 | 18 | 53 | −5 | 5 | 21 | 27 | 11 |
| 24 | −2 | 16 | 54 | −4 | 5 | 20 | 28 | 11 |
| 25 | −2 | 15 | 55 | −4 | 4 | 20 | 28 | 12 |
| 26 | −2 | 14 | 56 | −4 | 4 | 19 | 28 | 13 |
| 27 | −2 | 12 | 57 | −3 | 4 | 19 | 28 | 13 |
| 28 | −2 | 10 | 58 | −2 | 4 | 18 | 29 | 13 |
| 29 | −1 | 7 | 60 | −2 | 3 | 18 | 29 | 14 |
| 30 | 0 | 4 | 62 | −2 | 3 | 17 | 29 | 15 |
| 31 | 0 | 2 | 63 | −1 | 3 | 17 | 29 | 15 |

The values of the prediction samples predSamples[x][y], with x=0 ... nTbW−1, y=0 ... nTbH−1 are derived as follows:
If predModeIntra is greater than or equal to 34, the following ordered steps apply:
 1. The reference sample array ref[x] is specified as follows:
  The following applies:

$$ref[x] = p[-1 - refIdx + x][-1 - refIdx], \text{ with}$$
$$x = 0 ... nTbW + refIdx$$

If intraPredAngle is less than 0, the main reference sample array is extended as follows:

$$\text{When } (nTbH * intraPredAngle) \gg 5 \text{ is less than } -1,$$
$$ref[x] = p[-1 - refIdx][-1 - refIdx + ((x * invAngle + 128) \gg 8)],$$
$$\text{with } x = -1 ... (nTbH * intraPredAngle) \gg 5$$
$$ref[((nTbH * intraPredAngle) \gg 5) - 1] =$$
$$ref[(nTbH * intraPredAngle) \gg 5]$$
$$ref[nTbW + 1 + refIdx] = ref[nTbW + refIdx]$$

Otherwise, $$ref[x] = p[-1 - refIdx + x][-1 - refIdx],$$
$$\text{with}$$
$$x = nTbW + 1 + refIdx ... refW + refIdx$$
$$ref[-1] = ref[0]$$

The additional samples ref[refW+refIdx+x] with x=1 ... (Max(1,nTbW/nTbH)*refIdx+1) are derived as follows:

$$ref[refW + refIdx + x] = p[-1 + refW][-1 - refIdx]$$

2. The values of the prediction samples predSamples [x][y], with x=0 ... nTbW−1, y=0 ... nTbH−1 are derived as follows:
  The index variable iIdx and the multiplication factor iFact are derived as follows:

$$iIdx = ((y + 1 + refIdx) * intraPredAngle) >> 5 + refIdx$$

$$iFact = ((y + 1 + refIdx) * intraPredAngle) \, \& \, 31$$

If cIdx is equal to 0, the following applies:
 The interpolation filter coefficients fT[j] with j=0 . . . 3 are derived as follows:

$$fT[j] = filterFlag\,?\,fG[iFact][j] : fC[iFact][j]$$

The value of the prediction samples predSamples[x][y] is derived as follows:

$$predSamples[x][y] = \text{Clip1}Y\left(\left(\left(\sum_{i=0}^{3} fT[i] * ref[x + iIdex + i]\right) + 32\right) >> 6\right)$$

Otherwise (cIdx is not equal to 0), depending on the value of iFact, the following applies:
 If iFact is not equal to 0, the value of the prediction samples predSamples[x][y] is derived as follows:

$$predSamples[x][y] =$$
$$((32 - iFact) * ref[x + iIdx + 1] + iFact * ref[x + iIdx + 2] + 16) >> 5$$

Otherwise, the value of the prediction samples predSamples[x][y] is derived as follows:

$$predSamples[x][y] = ref[x + iIdx + 1]$$

Otherwise (predModeIntra is less than 34), the following ordered steps apply:
 1. The reference sample array ref[x] is specified as follows:
  The following applies:

$$ref[x] = p[-1 - refIdx][-1 - refIdx + x], \text{ with } x = 0 \ldots mTbH + refIdx$$

If intraPredAngle is less than 0, the main reference sample array is extended as follows:
 When (nTbW*intraPredAngle)>>5 is less than −1, $$ref[x] = ]\,[-1 - refIdx + ((x * invAngle + 128) >> 8)][-1 - refIdx],$$
$$\text{with } x = -1 \ldots (nTbW * intraPredAngle) >> 5$$

$$ref\left[((nTbW * intraPredAngle) >> 5) - 1\right] =$$
$$ref\left[(nTbW * intraPredAngle) >> 5\right]$$

$$ref[nTbG + 1 + refIdx] = ref[nTbH + refIdx]$$

Otherwise, $$ref[x] = p[-1 - refIdx][-1 - refIdx + x], \text{ with}$$
$$x = nTbH + 1 + refIdx \ldots refH + refIdx$$
$$ref[-1] = ref[0]$$

The additional samples ref[refH+refIdx+x] with x=1 . . . (Max(1, nTbW/nTbH)*refIdx+1) are derived as follows:

$$ref[refH + refIdx + x] = p[-1 + refH][-1 - refIdx]$$

2. The values of the prediction samples predSamples[x][y], with x=0 . . . nTbW−1, y=0 . . . nTbH−1 are derived as follows:
 The index variable iIdx and the multiplication factor iFact are derived as follows:

$$iIdx = ((x + 1 + refIdx) * intraPredAngle) >> 5$$

$$iFact = ((x + 1 + refIdx) * intraPredAngle) \, \& \, 31$$

If cIdx is equal to 0, the following applies:
 The interpolation filter coefficients fT[j] with j=0 . . . 3 are derived as follows:

$$fT[j] = filterFlag\,?\,fG[iFact][j] : fC[iFact][j]$$

The value of the prediction samples predSamples[x][y] is derived as $$predSamples[x][y] = \text{Clip1}Y\left(\left(\left(\sum_{i=0}^{3} fT[1] * ref[y + iIdx + i]\right) + 32\right) >> 6\right)$$

Otherwise (cIdx is not equal to 0), depending on the value of iFact, the following applies:
 If iFact is not equal to 0, the value of the prediction samples predSamples[x][y] is derived as follows:

$$predSamples[x][y] =$$
$$((32 - iFact) * ref[y + iIdx + 1] + iFact * ref[y + iIdx + 2] + 16) >> 5$$

Otherwise, the value of the prediction samples predSamples[x][y] is derived as follows:

$$predSamples[x][y] = ref[y + iIdx + 1]$$

It should be noted that according to the process for deriving an array of prediction samples provided in JVET-N1001, padding of the reference sample array is defined as follows (assuming a "vertical" prediction using the "above" samples):
 If the angle is positive, the first sample is replicated to the left and the last sample is replicated to the right;

If the angle is negative, the sample aligned with the rightmost column of the current PU is replicated to the right, and samples from the left reference array are projected to extend the reference array to the left.

Padding to the left when the angle is positive appears unnecessary as the padded sample is never referenced. Padding to the right when the angle is negative is undesirable as a valid sample is generally available. In a video encoder, if using the same reference array for testing various angles, this sample is needlessly changed from mode to mode. Thus, the padding provided in JVET-N1001 is less than ideal. Further, the projection process provided in JVET-N1001 is less than ideal.

It should be noted that JVET-N1001 provides cross component prediction modes for chroma. Further, there may be various ways in which intra prediction modes for the chroma components may be derived based on the intra prediction mode for the luma component. An intra-prediction mode for a current video block may be signaled, in one example, by using a so-called most probable mode (MPM). Typically, in MPM signaling, an intra-prediction mode is signaled as follows: a MPM list is created (e.g., by inheriting intra-prediction modes of neighboring video blocks); an indication is provided (e.g., a flag) as to whether the intra-prediction of the current video block is a mode in the MPM list; and if the current intra mode is in the MPM list, then an index may be signaled indicating the position of the corresponding entry in the MPM list; or if the current intra mode is not in the MPM list, then syntax element(s) are signaled indicating the intra-mode prediction mode (which is a mode that is not in the MPM list).

Further, in JVET-N1001, a so-called Intra Sub-Partitions (ISP) coding mode may be used for intra prediction. For the ISP coding mode in JVET-N1001, some luma intra-predicted blocks (i.e., luma CBs) are further divided vertically or horizontally into two or four sub-partitions depending on the block size dimensions. In JVET-N1001, each of the sub-partitions in the luma intra-predicted block share the same intra prediction mode. Table 3 illustrates the relevant portion of the coding unit syntax for intra prediction in JVET-N1001 and includes syntax elements corresponding to the ISP coding mode.

TABLE 3

| | Descriptor |
|---|---|
| coding_unit( x0, y0, cbWidth, cbHeight, treeType ) { | |
|   if( slice_type != I \|\| sps_ibc_enabled flag ) { | |
|     if( treeType != DUAL_TREE_CHROMA && | |
|      !( cbWidth = = 4 && cbHeight = = 4 && !sps_ibc_enabled_flag ) ) | |
|      cu_skip_flag[ x0 ][ y0 ] | ae(v) |
|     if( cu_skip_flag[ x0 ][ y0 ] = = 0 && slice_type != I | |
|      && !( cbWidth = = 4 && cbHeight = = 4 ) ) | |
|      pred_mode_flag | ae(v) |
|     if( ( ( slice_type = = I && cu_skip_flag[ x0 ][ y0 ] = =0 ) \|\| | |
|      ( slice_type != I && ( CuPredMode[ x0 ][ y0 ] != MODE_INTRA \|\| | |
|      ( cbWidth = = 4 && cbHeight = = 4 && cu_skip_flag[ x0 ][ y0 ] = = 0 ) ) ) ) && | |
|      sps_ibc_enabled_flag && ( cbWidth != 128 \|\| cbHeight != 128 ) ) | |
|      pred_mode_ibc flag | ae(v) |
|   } | |
|   if( CuPredMode[ x0 ][ y0 ] = = MODE_INTRA ) { | |
|   ... | |
|   } else { | |
|     if( treeType = = SINGLE_TREE \|\| treeType = = DUAL_TREE_LUMA ) { | |
|      if( cbWidth <= 32 && cbHeight <= 32 ) | |
|       intra_bdpcm_flag[ x0 ] [ y0 ] | ae(v) |
|      if( intra_bdpcm_flag[ x0 ][ y0 ] ) | |
|       intra_bdpcm_dir_flag[ x0 ][ y0 ] | ae(v) |
|      else { | |
|       if( sps_mip_enabled_flag && | |
|        ( Abs( Log2( cbWidth ) − Log2( cbHeight ) ) <= 2 ) && | |
|        cbWidth <= MaxTbSizeY && cbHeight <= MaxTbSizeY ) | |
|       intra_mip_flag[ x0 ][ y0 ] | ae(v) |
|       if( intra_mip_flag[ x0 ][ y0 ] ) { | |
|        intra_mip_mpm_flag[ x0 ][ y0 ] | ae(v) |
|        if( intra_mip_mpm_flag[ x0 ][ y0 ] ) | |
|         intra_mip_mpm_idx[ x0 ][ y0 ] | ae(v) |
|        else | |
|         intra_mip_mpm_remainder[ x0 ][ y0 ] | ae(v) |
|       } else { | |
|        if( sps_mrl_enabled_flag && ( ( y0% CtbSizeY ) > 0 ) ) | |
|         intra_luma_ref_idx[ x0 ][ y0 ] | ae(v) |
|        if ( sps_isp_enabled_flag && intra_luma_ref_idx[ x0 ] [ y0 ] = = 0 && | |
|        ( cbWidth <= MaxTbSizeY && cbHeight <= MaxTbSizeY ) && | |
|        ( cbWidth * cbHeight > MinTbSizeY * MinTbSizeY ) ) | |
|         intra_subpartitions_mode_flag[ x0 ][ y0 ] | ae(v) |
|        if( intra_subpartitions_mode_flag[ x0 ][ y0 ] = = 1 && | |
|         cbWidth <= MaxTbSizeY && cbHeight <= MaxTbSizeY ) | |
|         intra_subpartitions_split_flag[ x0 ][ y0 ] | ae(v) |
|        if( intra_luma_ref_idx[ x0 ][ y0 ] = = 0 && | |
|         intra_subpartitions_mode_flag[ x0 ][ y0 ] = = 0 ) | |

TABLE 3-continued

| | Descriptor |
|---|---|
| intra_luma_mpm_flag[ x0 ][ y0 ] | ae(v) |
|     if( intra_luma_mpm_flag[ x0 ][ y0 ] ) { | |
|         if( intra_luma_ref_idx[ x0 ][ y0 ] = = 0 ) | |
|         intra_luma_not_planar_flag[ x0 ][ y0 ] | ae(v) |
|         if( intra_luma_not_planar_flag[ x0 ][ y0 ] ) | |
|         intra_luma_mpm_idx[ x0 ][ y0 ] | ae(v) |
|     } else | |
|         intra_luma_mpm_remainder[ x0 ][ y0 ] | ae(v) |
|     } | |
|     } | |
|   } | |
|   if( treeType = = SINGLE_TREE || treeType = = DUAL_TREE_CHROMA ) | |
|     intra_chroma_pred_mode[ x0 ][ y0 ] | ae(v) |
|   } | |
| } else if( treeType != DUAL_TREE_CHROMA ) { /* MODE_INTER or MODE_IBC */ | |
|   ... | |
| } | |

With respect to the syntax elements included in Table 3 JVET-N1001 provides the following semantics:

cu_skip_flag[x0][y0] equal to 1 specifies that for the current coding unit, when decoding a P or B slice, no more syntax elements except one or more of the following are parsed after cu_skip_flag[x0][y0]: the IBC mode flag pred_mode_ibc_flag[x0][y0], and the merge_data( ) syntax structure; when decoding an I slice, no more syntax elements except merge_idx[x0][y0] are parsed after cu_skip_flag[x0][y0]. cu_skip_flag[x0][y0] equal to 0 specifies that the coding unit is not skipped. The array indices x0, y0 specify the location (x0, y0) of the top-left luma sample of the considered coding block relative to the top-left luma sample of the picture.

When cu_skip_flag[x0][y0] is not present, it is inferred to be equal to 0.

pred_mode_flag equal to 0 specifies that the current coding unit is coded in inter prediction mode. pred_mode_flag equal to 1 specifies that the current coding unit is coded in intra prediction mode.

When pred_mode_flag is not present, it is inferred as follows:
If cbWidth is equal to 4 and cbHeight is equal to 4, pred_mode_flag is inferred to be equal to 1.
Otherwise, prod_mode_flag is inferred to be equal to 1 when decoding an I slice, and equal to 0 when decoding a P or B slice, respectively.

The variable CuPredMode[x][y] is derived as follows for x=x0 . . . x0+cbWidth−1 and y=y0 . . . y0+cbHeight−1:
If pred_mode_flag is equal to 0. CuPredMode[x][y] is set equal to MODE_INTER.
Otherwise (pred_mode_flag is equal to 1), CuPredMode[x][y] is set equal to MODE_INTRA.

pred_mode_ibc_flag equal to 1 specifies that the current coding unit is coded in IBC prediction mode. pred_mode_ibc_flag equal to 0 specifies that the current coding unit is not coded in IBC prediction mode.

When pred_mode_ibc_flag is not present, it is inferred as follows:
If cu_skip_flag[x0][y0] is equal to 1, and cbWidth is equal to 4, and cbHeight is equal to 4, pred_mode_ibc_flag is inferred to be equal 1.
Otherwise, if both cbWidth and cbHeight are equal to 128, pred_mode_ibc_flag is inferred to be equal to 0.
Otherwise, pred_mode_ibc_flag is inferred to be equal to the value of sps_ibc_enabled_flag when decoding an I slice, and 0 when decoding a P or B slice, respectively.

When pred_mode_ibc_flag is equal to 1, the variable CuPredMode[x][y] is set to be equal to MODE_IBC for x=x0 . . . x0+cbWidth−1 and y=y0 . . . y0+cbHeight−1.

intra_bdpcm_flag[x0][y0] equal to 1 specifies that BDPCM is applied to the current luma coding block at the location (x0,y0), i.e. the transform is skipped, the intra luma prediction mode is specified by intra_bdpcm_dir_flag[x0][y0]. intra_bdpcm_dir_flag[x0][y0] equal to 0 specifies that BDPCM is not applied to the current luma coding block at the location (x0, y0).

When intra_bdpcm_flag[x0][y0] is not present it is inferred to be equal to 0.

The variable BdpcmFlag[x][y] is set equal to intra_bdpcm_flag[x0][y0] for x=x0 . . . x0+cbWidth−1 and y=y0 . . . y0+cbHeight−1.

intra_bdpcm_dir_flag[x0][y0] equal to 0 specifies that the BDPCM prediction direction is horizontal. intra_bdpcm_dir_flag[x0][y0] equal to 1 specifies that the BDPCM prediction direction is vertical.

The variable BdpcmDir[x][y] is set equal to intra_bdpcm_dir_flag[x0][y0] for x=x0 . . . x0+cbWidth−1 and y=y0 . . . y0+cbHeight−1.

intra_mip_flag[x0][y0] equal to 1 specifies that the intra prediction type for luma samples is matrix-based intra prediction. intra_mip_flag[x0][y0] equal to 0 specifies that the intra prediction type for luma samples is not matrix-based intra prediction.

When intra_mip_flag[x0][y0] is not present, it is inferred to be equal to 0.

The syntax elements intra_mip_mpm_flag[x0][y0], intra_mip_mpm_idx[x0][y0] and intra_mip_mpm_remainder[x0][y0] specify the matrix-based intra prediction mode for luma samples. The array indices x0, y0 specify the location (x0, y0) of the top-left luma sample of the considered coding block relative to the top-left luma sample of the picture. When intra_mip_mpm_flag[x0][y0] is equal to 1, the matrix-based intra prediction mode is inferred from a neighbouring intra-predicted coding unit.

When intra_mip_mpm_flag[x0][y0] is not present, it is inferred to be equal to 1.

intra_luma_ref_idx[x0][y0] specifies the intra prediction reference line index IntraLumaRefLineIdx[x][y] for x=x0 . . . x0+cbWidth−1 and y=y0 . . . y0+cbHeight−1 as specified in Table 4.

When intra_luma_ref_idx[x0][y0] is not present it is inferred to be equal to 0.

TABLE 4

| intra_luma_ref_idx[ x0 ] [ y0 ] | IntraLumaRefLineIdx[ x ] [ y ]<br>x = x0..x0 + cbWidth − 1<br>y = y0..y0 + cbHeight − 1 |
| --- | --- |
| 0 | 0 |
| 1 | 1 |
| 2 | 3 | intra_subpartitiona_mode_flag[x0][y0] equal to 1 specifies that the current intra coding unit is partitioned into NumIntraSubPartitions[x0][y0] rectangular transform block subpartitions. intra_subpartitions_mode_flag[x0][y0] equal to 0 specifies that the current intra coding unit is not partitioned into rectangular transform block subpartitions. When intra_subpartitions_mode_flag[x0][y0] is not present, it is inferred to be equal to 0.

intra_subpartitions_split_flag[x0][y0] specifies whether the intra subpartitions split type is horizontal or vertical. When intra_subpartitions_split_flag[x0][y0] is not present, it is inferred as follows:

If cbHeight is greater than MaxTbSizeY, intra_subpartitions_split_flag[x0][y0] is inferred to be equal to 0.

Otherwise (cbWidth is greater than MaxTbSizeY), intra_subpartitions_split_flag[x0][y0] is inferred to be equal to 1.

The variable IntraSubPartitionsSplitType specifies the type of split used for the current luma coding block as illustrated in Table 5 IntraSubPartitionsSplitType is derived as follows:

If intra_subpartitions_mode_flag[x0][y0] is equal to 0, IntraSubPartitionsSplitType is set equal to 0.

Otherwise, the IntraSubPartitionsSplitType is set equal to 1+intra_subpartitions_split_flag[x0][y0].

TABLE 5

| IntraSubPartitionsSplitType | Name of IntraSubPartitionsSplitType |
| --- | --- |
| 0 | ISP_NO_SPLIT |
| 1 | ISP_HOR_SPLIT |
| 2 | ISP_VER_SPLIT |

The variable NumIntraSubPartitions specifies the number of transform block subpartitions into which an intra luma coding block is divided. NumIntraSubPartitions is derived as follows:

If IntraSubPartitionsSplitType is equal to ISP_NO_SPLIT, NumIntraSubPartitions is set equal to 1.

Otherwise, if one of the following conditions is true, NumIntraSubPartitions is set equal to 2:
cbWidth is equal to 4 and cbHeight is equal to 8,
cbWidth is equal to 8 and cbHeight is equal to 4.

Otherwise, NumIntraSubPartitions is set equal to 4.

The syntax elements intra_luma_mpm_flag[x0][y0], intra_luma_not_planar_flag[x0][y0], intra_luma_mpm_idx[x0][y0] and intra_luma_mpm_remainder[x0][y0] specify the intra prediction mode for luma samples. The array indices x0, y0 specify the location (x0, y0) of the top-left luma sample of the considered coding block relative to the top-left luma sample of the picture. When intra_luma_mpm_flag[x0][y0] is equal to 1, the intra prediction mode is inferred from a neighbouring intra-predicted coding unit.

When intra_luma_mpm_flag[x0][y0] is not present, it is inferred to be equal to 1. When intra_luma_not_planar_flag[x0][y0] is not present, it is inferred to be equal to 1.

intra_chroma_pred_mode[x0][y0] specifies the intra prediction mode for chroma samples. The array indices x0, y0 specify the location (x0, y0) of the top-left luma sample of the considered coding block relative to the top-left luma sample of the picture.

Further, JVET-N1001 provides the following decoding process for intra blocks, which specifies how luma intra-predicted blocks are further divided vertically or horizontally into two or four sub-partitions according to ISP coding mode:

Decoding Process for Intra Blocks

Inputs to this process are:
a sample location (xTb0, yTb0) specifying the top-left sample of the current transform block relative to the top-left sample of the current picture,
a variable nTbW specifying the width of the current transform block,
a variable nTbH specifying the height of the current transform block,
a variable predModeIntra specifying the intra prediction mode.
a variable cIdx specifying the colour component of the current block.

Output of this process is a modified reconstructed picture before in-loop filtering.

The maximum transform block size maxTbSize is derived as follows:

$$maxTbSize = (cIdx == 0)? MaxTbSizeY : MaxTbSizeY/2$$

The luma sample location is derived as follows:

$$(xTbY, yTbY) = (cIdx == 0)?(xTb0, yTb0):(xTb0*2, yTb0*2)$$

Depending on maxTbSize, the following applies:
If IntraSubPartitionsSplitType is equal to NO_ISP_SPLIT and nTbW is greater than maxTbSize or nTbH is greater than maxTbSize, the following ordered steps apply.
1. The variables newTbW and newTbH are derived as follows:

$$newTbW = (nTbW > maxTbSize)?(nTbW/2): nTbW$$

$$newTbH = (nTbH > maxTbSize)?(nTbH/2): nTbH$$

2. The general decoding process for intra blocks as specified in this clause is invoked with the location (xTb0, yTb0), the transform block width nTbW set equal to newTbW and the height nTbH set equal to newTbH, the intra prediction mode predModeIntra, and the variable cIdx as inputs, and the output is a modified reconstructed picture before in-loop filtering.
3. If nTbW is greater than maxTbSize, the general decoding process for intra blocks as specified in this clause is invoked with the location (xTb0, yTb0) set equal to (xTb0+newTbW, yTb0), the transform block width nTbW set equal to newTbW and the height nTbH set equal to newTbH, the intra prediction mode predModeIntra, and the variable cIdx as inputs, and the output is a modified reconstructed picture before in-loop filtering.

4. If nTbH is greater than maxTbSize, the general decoding process for intra blocks as specified in this clause is invoked with the location (xTb0, yTb0) set equal to (xTb0, yTb0+newTbH), the transform block width nTbW set equal to newTbW and the height nTbH set equal to newTbH, the intra prediction mode predModeIntra, and the variable cIdx as inputs, and the output is a modified reconstructed picture before in-loop filtering.

5. If nTbW is greater than maxTbSize and nTbH is greater than maxTbSize, the general decoding process for intra blocks as specified in this clause is invoked with the location (xTb0, yTb0) set equal to (xTb0+newTbW, yTb0+newTbH), the transform block width nTbW set equal to newTbW and the height nTbH set equal to newTbH, the intra prediction mode predModeIntra, and the variable cIdx as inputs, and the output is a modified reconstructed picture before in-loop filtering.

Otherwise, the following ordered steps apply:
The variables nW, nH, numPartsX and numPartsY are derived as follows:

$$nW = IntraSubPartitionsSplitType == ISP\_VER\_SPLIT?$$
$$nTbW/NumIntraSubPartitions: nTbW$$
$$nH = IntraSubPartitionsSplitType == ISP\_HOR\_SPLIT?$$
$$nTbH/NumIntraSubPartitions: nTbH$$
$$numPartsX = IntraSubPartitionsSplitType == ISP\_VER\_SPLIT?$$
$$NumIntraSubPartitions: 1$$
$$numPartsY = IntraSubPartitionsSplitType == ISP\_HOR\_SPLIT?$$
$$NumIntraSubPartitions: 1$$

For xPartIdx=0 . . . numPartsX−1 and yPartIdx=0 . . . numPartsY−1, the following applies:
1. The intra sample prediction process as specified below is invoked with the location (xTbCmp, yTbCmp) set equal to (xTb0+nW*xPartIdx, yTb0+nH*yPartIdx), the intra prediction mode predModeIntra, the transform block width nTbW and height nTbH set equal to nW and nH, the coding block width nCbW and height nCbH set equal to nTbW and nTbH, and the variable cIdx as inputs, and the output is an (nTbW)×(nTbH) array predSamples.

Intra Sample Prediction Process
Inputs to this process are:
a sample location (xTbCmp, yTbCmp) specifying the top-left sample of the current transform block relative to the top-left sample of the current picture, a variable predModeIntra specifying the intra prediction mode,
a variable nTbW specifying the transform block width,
a variable nTbH specifying the transform block height,
a variable nCbW specifying the coding block width,
a variable nCbH specifying the coding block height,
a variable cIdx specifying the colour component of the current block.

Outputs of this process are the predicted samples predSamples[x][y], with x=0 . . . nTbW−1, y=0 . . . nTbH−1.

The predicted samples predSamples[x][y] are derived as follows:
If intra_mip_flag[xTbComp][yTbComp] is equal to 1 and cIdx is equal to 0, the matrix-based intra sample prediction process is invoked with the location (xTbCmp, yTbCmp), the intra prediction mode predModeIntra, the transform block width nTbW and height nTbH as inputs, and the output is predSamples.

Otherwise, the general (non-mip) intra sample prediction process as specified below is invoked with the location (xTbCmp, yTbCmp), the intra prediction mode predModeIntra, the transform block width nTbW and height nTbH, the coding block width nCbW and height nCbH, and the variable cIdx as inputs, and the output is predSamples.

General (Non-Mip) Intra Sample Prediction Process
Inputs to this process are:
a sample location (xTbCmp, yTbCmp) specifying the top-left sample of the current transform block relative to the top-left sample of the current picture,
a variable predModeIntra specifying the intra prediction mode,
a variable nTbW specifying the transform block width,
a variable nTbH specifying the transform block height,
a variable nCbW specifying the coding block width,
a variable nCbH specifying the coding block height,
a variable cIdx specifying the colour component of the current block.

Outputs of this process are the predicted samples predSamples[x][y], with x=0 . . . nTbW−1, y=0 . . . nTbH−1.

The variables refW and refH are derived as follows:
If IntraSubPartitionsSplitType is equal to ISP_NO_SPLIT or cIdx is not equal to 0, the following applies:

$$refW = nTbW * 2$$
$$refH = nTbH * 2$$

Otherwise (IntraSubPartitionsSplitType is not equal to ISP_NO_SPLIT and cIdx is equal to 0), the following applies:

$$refW = nCbW * 2$$
$$refH = nCbH * 2$$
$$refIdx = (cIdx == 0)?IntraLumaRefLineIdx[xTbCmp][yTbCmp]: 0$$

The wide angle intra prediction mode mapping process is invoked with predModeIntra, nTbW, nTbH and cIdx as inputs, and the modified predModeIntra as output.

The variable refFilterFlag is derived as follows:
if predModeIntra is equal to one of the following values: 0, −14, −12, −10, −6, 2, 34, 66, 72, 76, 78, 80, then refFilterFlag is set equal to 1.
Otherwise, refFilterFlag is set equal to 0.

For the generation of the reference samples p[x][y] with x=−1−refIdx, y=−1−refIdx . . . refH−1 and x=−refIdx . . . refIdx−1, y=−1−refIdx, the following ordered steps apply:

1. The reference sample availability marking process is invoked with the sample location (xTbCmp, yTbCmp), the intra prediction reference line index refIdx, the reference sample width refW, the reference sample height refH, the colour component index cIdx as inputs, and the reference samples refUnfilt[x][y] with x=−1−refIdx, y=−1−refIdx . . . refH−1 and x=−refIdx . . . refW−1, y=−1−refIdx as output.
2. When at least one sample refUnfilt[x][y] with x=−1−refIdx, y=−1−refIdx . . . refH−1 and x=−refIdx . . . refW−1, y=−1−refIdx is marked as "not available for intra prediction", the reference sample substitution process is invoked with the intra prediction reference line index refIdx, the reference sample width refW, the reference sample height refH, the reference samples refUnfilt[x][y] with x=−1−refIdx, y=−1−refIdx . . . refH−1 and x=−refIdx . . . refW−1, y=−1−refIdx, and the colour component index cIdx as inputs, and the modified reference samples refUnfilt[x][y] with x=−1−refIdx, y=−1−refIdx . . . refH−1 and x=−refIdx . . . refW−1, y=−1−refIdx as output.
3. The reference sample filtering process as specified below is invoked with the intra prediction reference line index refIdx, the transform block width nTbW and height nTbH, the reference sample width refW, the reference sample height refH, the reference filter flag refFilterFlag, the unfiltered samples refUnfilt[x][y] with x=−1−refIdx, y=−1−refIdx . . . refH−1 and x=−refIdx . . . refW−1, y=−1−refIdx, and the colour component index cIdx as inputs, and the reference samples p[x][y] with x=−1−refIdx, y=−1−refIdx . . . refH−1 and x=−refIdx . . . refW−1, y=−1−refIdx as output.

The intra sample prediction process according to predModeIntra applies as follows:

If predModeIntra is equal to INTRA_PLANAR, the corresponding intra prediction mode process is invoked with the transform block width nTbW, and the transform block height nTbH, and the reference sample array p as inputs, and the output is the predicted sample array predSamples.

Otherwise, if predModeIntra is equal to INTRA_DC, the corresponding intra prediction mode process is invoked with the transform block width nTbW, the transform block height nTbH, the intra prediction reference line index refIdx. and the reference sample array p as inputs, and the output is the predicted sample array predSamples.

Otherwise, if predModeIntra is equal to INTRA_LT_CCLM, INTRA_L_CCIM or INTRA_T_CCLM, the corresponding intra prediction mode process is invoked with the intra prediction mode predModeIntra, the sample location (xTbC, yTbC) set equal to (xTbCmp, yTbCmp), the transform block width nThW and height nTbH, and the reference sample array p as inputs, and the output is the predicted sample array predSamples.

Otherwise, the corresponding directional intra prediction mode process specified above is invoked with the intra prediction mode predModeIntra, the intra prediction reference line index refIdx, the transform block width nTbW, the transform block height nTbH, the reference sample width refW, the reference sample height refH, the coding block width nCbW and height nCbH, the reference filter flag refFilterFlag, the colour component index cIdx, and the reference sample array p as inputs, and the predicted sample array predSamples as outputs.

When all of the following conditions are true, the position-dependent prediction sample filtering process specified below is invoked with the intra prediction mode predModeIntra, the transform block width nThW, the transform block height nTbH, the predicted samples predSamples[x][y], with x=0 . . . nTbW−1, y=0 . . . nTbH−1, the reference sample width refW, the reference sample height refH, the reference samples p[x][y], with x=−1, y=−1 . . . refH−1 and x=0 . . . refW−1, y=−1, and the colour component index cIdx as inputs, and the output is the modified predicted sample array predSamples:

IntraSubPartitionsSplitType is equal to ISP_NO_SPLIT or cIdx is not equal to 0
    refIdx is equal to 0 or cIdx is not equal to 0
    BdpcmFlag[xTbCmp][xTbCmp] is equal to 0
    One of the following conditions is true:
        predModeIntra is equal to INTRA_PLANAR
        predModeIntra is equal to TNTRA_DC
        predModeIntra is equal to INTRA_ANGULAR18
        predModeIntra is equal to INTRA_ANGULAR50
        predModeIntra is less than or equal to INTRA_ANGULAR10
        predModeIntra is greater than or equal to INTRA_ANGULAR58

It should be noted that according to the Decoding process for intra blocks, Intra sample prediction process, and General (non-mip) Intra sample prediction process provided above, in JVET-N1001, the reference samples which may be retrieved from previously coded CUs for the purpose of intra prediction varies based on whether ISP is used for a given CU. That is, for a CU coded in ISP mode, samples may be retrieved which are outside the range of reference samples provided for other CUs. Having an increased range of samples which may be retrieved for a CU coded in ISP mode is less than ideal.

As described above, the generation of an array of prediction samples may include filtering prediction sample values. It should be noted that according to the Directional Intra Prediction Mode Process, a variable filterFlag determines whether an angular prediction is smoothed. According to the derivation of filterFlag provided in JVET-N1001 different rules apply for determining the variable filterFlag when ISP is used, which is undesirable.

Further, JVET-N1001 specifies the following reference sampling filtering process:

Reference Sample Filtering Process

Inputs to this process are:
        a variable refIdx specifying the intra prediction reference line index,
        a variable nTbW specifying the transform block width,
        a variable nTbH specifying the transform block height,
        a variable refW specifying the reference samples width,
        a variable refH specifying the reference samples height,
        a variable refFilterFlag specifying the value of reference filter flag,
        the (unfiltered) neighbouring samples refUnfilt[x][y], with x=−1−refIdx, y=−1−refIdx . . . refH−1 and x=−refIdx . . . refW−1, y=−1−refIdx,
        a variable cIdx specifying the colour component of the current block.
    Outputs of this process are the reference samples p[x][y], with x=−1−refIdx, y=−1−refIdx . . . refH−1 and x=−refIdx . . . refW−1, y=−1−refIdx.
    The variable filterFlag is derived as follows:
    If all of the following conditions are true, filterFlag is set equal to 1:
        refIdx is equal to 0
        nThW*nTbH is greater than 32
        cIdx is equal to 0

IntraSubPartitionsSplitType is equal to ISP_NO_SPLIT
refFilterFlag is equal to 1
Otherwise, filterFlag is set equal to 0.
For the derivation of the reference samples p[x][y] the following applies:
If filterFlag is equal to 1, the filtered sample values p[x][y] with x=−1, y=−1 . . . refH−1 and x=0 . . . refW−1, y=−1 are derived as follows:

$$p[-1][-1] =$$
$$(refUnfilt[-1][0] + 2*refUnfilt[-1][-1] + refUnfilt[0][-1] + 2) \gg 2$$
$$p[-1][y] =$$
$$(refUnfilt[-1][y+1] + 2*refUnfilt[-1][y] + refUnfilt[-1][y-1] + 2) \gg 2$$
$$\text{for } y = 0 \ldots refH - 2$$
$$p[-1][refH-1] = refUnfilt[-1][refH-1]$$
$$p[x][-1] =$$
$$(refUnfilt[x-1][-1] + 2*refUnfilt[x][-1] + refUnfilt[x+1][-1] + 2) \gg 2$$
$$\text{for } x = 0 \ldots refW - 2$$
$$p[refW-1][-1] = refUnfilt[refW-1][-1]$$

Otherwise, the reference samples values p[x][y] are set equal to the unfiltered sample values refUnfilt[x][y] with x=−1−refIdx, y=−1−refIdx . . . refH−1 and x=−refIdx . . . refW−1, y=−1−refIdx.

It should be noted that according to the Directional Intra Prediction Mode Process, the General (non-mip) Intra sample prediction process, and the Reference sample filtering process provided above, in JVET-N1001, reference samples are smoothed for angular prediction when the slope is an integer slope and when reference samples are smoothed, cubic interpolation filter is used instead of Gaussian filter. Having special rules for angles that have integer slopes is less than ideal as it is needlessly complex and may apply smoothing to a relatively large number of samples.

As provided above, in General (non-mip) Intra sample prediction process, NET-N1001 further specifies a position dependent intra prediction combination (PDPC) which may be applied to intra predicted samples. The PDPC applies filters to intra predicted samples using reference samples with weights. In particular, in JVET-N1001 provides the following Position-dependent intra prediction sample filtering process:

Position-Dependent Intra Prediction Sample Filtering Process
Inputs to this process are:
the intra prediction mode predModeIntra,
a variable nTbW specifying the transform block width,
a variable nTbH specifying the transform block height,
a variable refW specifying the reference samples width,
a variable refH specifying the reference samples height.
the predicted samples predSamples[x][y], with x=0 . . . nTbW−1, y=0 . . . nTbH−1,
the neighbouring samples p[x][y], with x=−1, y=−1 . . . refH−1 and x=0 . . . refW−1, y=−1,
a variable cIdx specifying the colour component of the current block.
Outputs of this process are the modified predicted samples predSamples[x][y] with x=0 . . . nTbW−1, y=0 . . . nTbH−1.

Depending on the value of cIdx, the function clip1Cmp is set as follows:
If cIdx is equal to 0, clip1Cmp is set equal to $Clip1_Y$.
Otherwise, clip1Cmp is set equal to $Clip1_C$.
The variable nScale is set to ((Log 2(nTbW)+Log 2(nTbH)−2)>>2).
The reference sample arrays mainRef[x] and sideRef[y], with x=0 . . . refW−1 and y=0 . . . refH−1 are derived as follows:

$$mainRef[x] = p[x][-1]$$
$$sideRef[y] = p[-1][y]$$

The variables refL[x][y], refT[x][y], wT[y], wL[x] and wTL[x][y] with x=0 . . . nTbW−1, y=0 . . . nTbH−1 are derived as follows:
If predModeIntra is equal to INTRA_PLANAR or INTRA_DC, the following applies:

$$refL[x][y] = p[-1][y]$$
$$refT[x][y] = p[x][-1]$$
$$wT[y] = 32 \gg ((y \ll 1) \gg nScale)$$
$$wL[x] = 32 \gg ((x \ll 1) \gg nScale)$$
$$wTL[x][y] =$$
$$(predModeIntra == INTRA\_DC)?((wL[x] \gg 4) + (wT[y] \gg 4)): 0$$

Otherwise, if predModeIntra is equal to INTRA_ANGULAR18 or INTRA_ANGULAR50, the following applies:

$$refL[x][y] = p[-1][y]$$
$$refT[x][y] = p[x][-1]$$
$$wT[y] =$$
$$(predModeIntra == INTRA\_ANGULAR18)?32 \gg ((y \ll 1) \gg nScale): 0$$
$$wL[x] =$$
$$(predModeIntra == INTRA\_ANGULAR50)?32 \gg ((x \ll 1) \gg nScale): 0$$
$$wTL[x][y] = (predModeIntra == INTRA\_ANGULAR18)? wT[y]: wL[x]$$

Otherwise, if predModeIntra is equal to INTRA_ANGULEAR2 or INTRA_ANGULAR66, the following applies:

$$refL[x][y] = p[-1][x+y+1]$$
$$refT[x][y] = p[x+y+1][-1]$$
$$wT[y] = (32 \gg 1) \gg ((y \ll 1) \gg nScale)$$
$$wL[x] = (32 \gg 1) \gg ((x \ll 1) \gg nScale)$$
$$wTL[x][y] = 0$$

Otherwise, if predModeIntra is less than or equal to INTRA_ANGULAR10, the following ordered steps apply:

1. The variables dXPos[y], dXFrac[y], dXInt[y] and dX[x][y] are derived as follows using invAngle as specified above depending on intraPredMode:

$$dXPos[y] = ((y+1)*invAngle+2) \gg 2$$

$$dXFrac[y] = dXPos[y] \,\&\, 63$$

$$dXInt[y] = dXPos[y] \gg 6$$

$$dX[x][y] = x + dXInt[y]$$

2. The variables refL[x][y], refT[x][y], wT[y], wL[x] and wTL[x][y] are derived as follows:

$$refL[x][y] = 0$$

$$refT[x][y] =$$
$$(dX[x][y] < refW - 1)? \, mainRef[dX[x][y] + (dXFrac[y] \gg 5)]:0$$

$$wT[y] = (dX[x][y] < refW - 1)? \, 32 \gg ((y \ll 1) \gg nScale):0$$

$$wL[x] = 0$$

$$wTL[x][y] = 0$$

Otherwise, if predModeIntra is greater than or equal to INTRA_ANGULAR58, the following ordered steps apply:

1. The variables dYPos[x], dYFrac[x], dYInt[x] and dY[x][y] are derived as follows using invAngle as specified above depending on intraPredMode:

$$dYPos[x] = ((x+1)*invAngle+2) \gg 2$$

$$dYFrac[x] = dYPos[x] \,\&\, 63$$

$$dyInt[x] = dYPos[x] \gg 6$$

$$dY[x][y] = y + dYInt[x]$$

2. The variables refL[x][y], refT[x][y], wT[y], wL[x] and wTL[x][y] are derived as follows:

$$refL[x][y] =$$
$$(dY[x][y] < refH - 1)\,?\,sideRef[dY[x][y] + (dYFrac[x] \gg 5)]:0$$

$$refT[x][y] = 0$$

$$wT[y] = 0$$

$$wL[x] = (dY[x][y] < refH - 1)\,?\,32 \gg ((x \ll 1) \gg nScale):0$$

$$wTL[x][y] = 0$$

Otherwise, refL[x][y], refT[x][y], wT[y], wL[x] and wTL[x][y] are all set equal to 0.

The values of the modified predicted samples predSamplea[x][y], with x=0 . . . nTbW−1, y=0 . . . nTbH−1 are derived as follows:

$$predSamples[x][y] = clip1Cmp((refL[x][y]*wL[x] +$$
$$refT[x][y]*wT[y] - p[-1][-1]*wTL[x][y] +$$
$$(64 - wL[x] - wT[y] + wTL[x][y])*predSamples[x][y] + 32) \gg 6)$$

The position-dependent intra prediction sample filtering process in JVET-N1001 may be less than ideal. In particular, there are two modes of PDPC operation for angular modes (other than HOR/VER). That is, special rules apply to modes 2 and 66, which may be unnecessarily complex. Also, for angular modes, there is a need to do a per-sample check to determine whether the referenced sample is within range. If it is not within range, the PDPC weight is set to 0 for the current sample. Further, for DC and planar modes, PDPC process is identical except for use of top-left reference, which may provide a less than ideal design.

Figure 5:
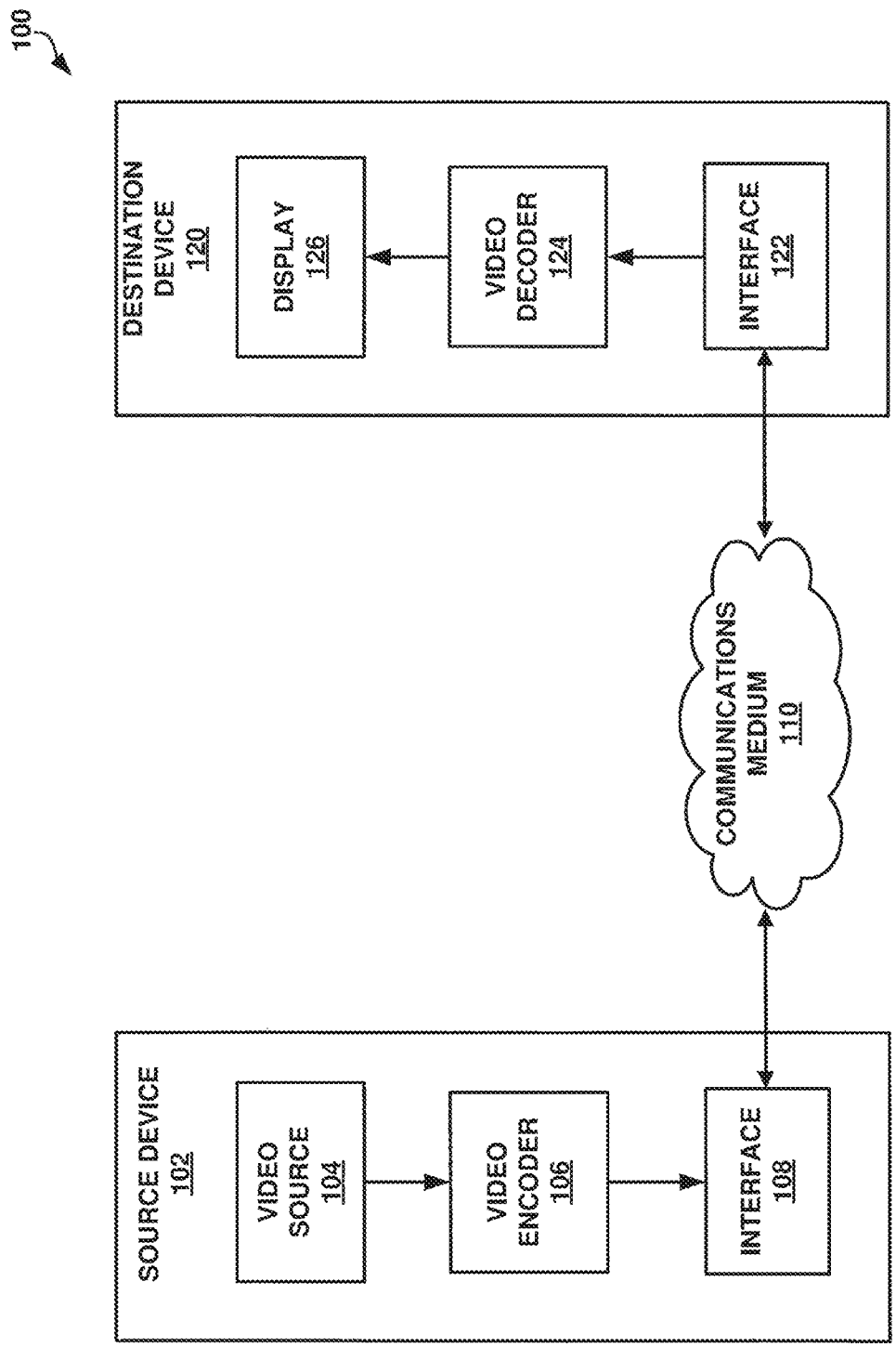
FIG. 5 is a block diagram illustrating an example of a system that may be configured to encode and decode video data according to one or more techniques of this disclosure.

FIG. 5 is a block diagram illustrating an example of a system that may be configured to code (i.e., encode and/or decode) video data according to one or more techniques of this disclosure. System 100 represents an example of a system that may perform video coding using partitioning techniques described according to one or more techniques of this disclosure. As illustrated in FIG. 5, system 100 includes source device 102, communications medium 110, and destination device 120. In the example illustrated in FIG. 5, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include set top boxes, digital video recorders, televisions, desktop, laptop, or tablet computers, gaming consoles, mobile devices, including, for example, "smart" phones, cellular telephones, personal gaming devices, and medical imagining devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Referring again to FIG. 5, source device 102 includes video source 104, video encoder 106, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible) or lossless. Interface 108 may include any device configured to receive a compliant video bitstream and transmit and/or store the compliant video bitstream to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a compliant video bitstream to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, $I^2C$, or any other logical and physical structure that may be used to interconnect peer devices.

Referring again to FIG. 5, destination device 120 includes interface 122, video decoder 124, and display 126. Interface 122 may include any device configured to receive a compliant video bitstream from a communications medium. Interface 108 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, $I^2C$, or any other logical and physical structure that may be used to interconnect peer devices. Video decoder 124 may include any device configured to receive a compliant bitstream and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 3, video decoder 124 is described as outputting data to display 126, video decoder 124 may be configured to output video data to various types of devices and/or sub-components thereof. For example, video decoder 124 may be configured to output video data to any communication medium, as described herein.

Figure 6:
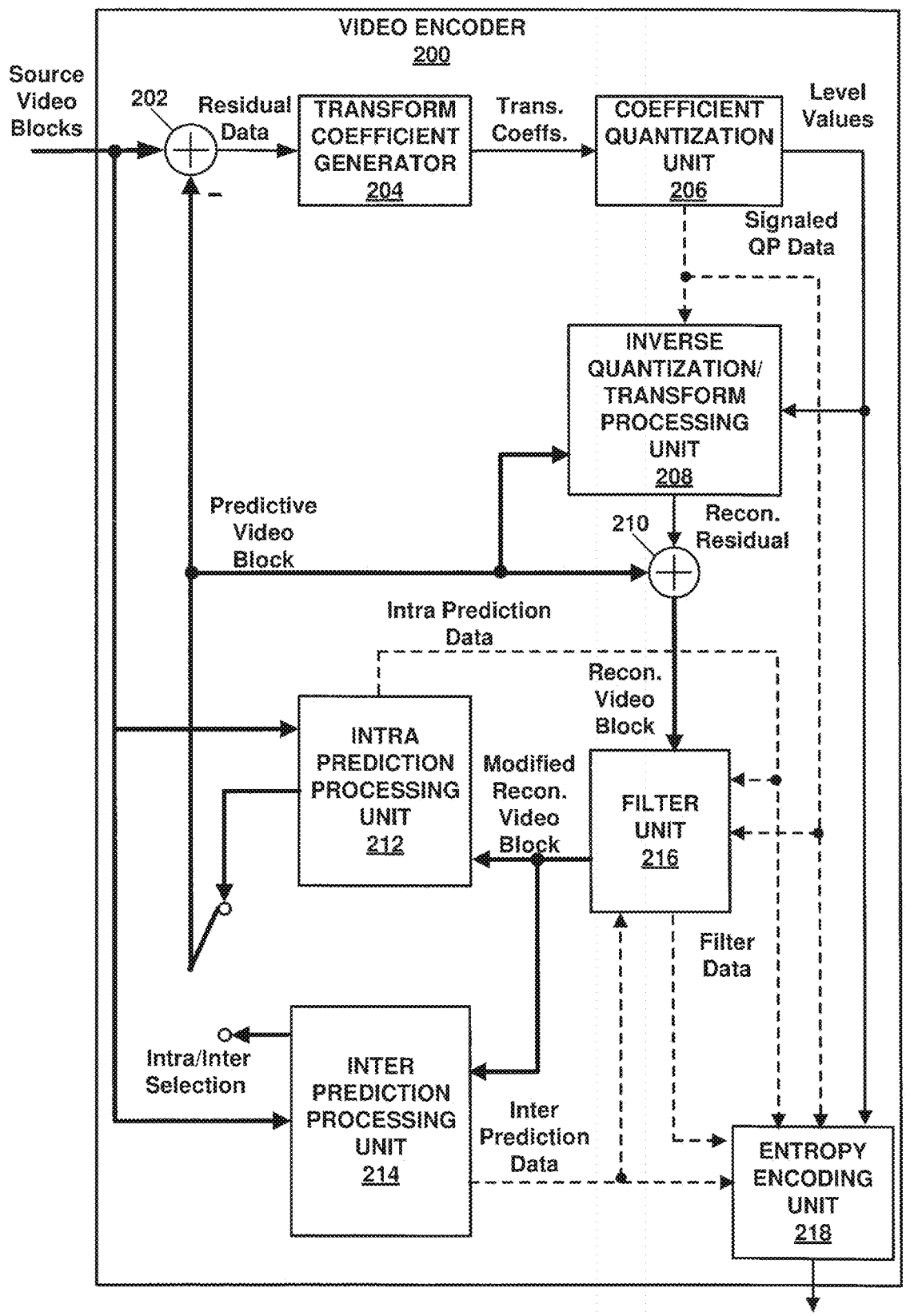
FIG. 6 is a block diagram illustrating an example of a video encoder that may be configured to encode video data according to one or more techniques of this disclosure.

FIG. 6 is a block diagram illustrating an example of video encoder 200 that may implement the techniques for encoding video data described herein. It should be noted that although example video encoder 200 is illustrated as having distinct functional blocks, such an illustration is for descriptive purposes and does not limit video encoder 200 and/or sub-components thereof to a particular hardware or software architecture. Functions of video encoder 200 may be realized using any combination of hardware, firmware, and/or software implementations. In one example, video encoder 200 may be configured to encode video data according to the techniques described herein. Video encoder 200 may perform intra prediction coding and inter prediction coding of picture areas, and, as such, may be referred to as a hybrid video encoder. In the example illustrated in FIG. 6, video encoder 200 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 200 may be configured to perform additional sub-divisions of source video blocks. It should be noted that some techniques described herein may be generally applicable to video coding, regardless of how source video data is partitioned prior to and/or during encoding. In the example illustrated in FIG. 6, video encoder 200 includes summer 202, transform coefficient generator 204, coefficient quantization unit 206, inverse quantization/transform processing unit 208, summer 210, intra prediction processing unit 212, inter prediction processing unit 214, filter unit 216, and entropy encoding unit 218.

As illustrated in FIG. 6, video encoder 200 receives source video blocks and outputs a bitstream. Video encoder 200 may generate residual data by subtracting a predictive video block from a source video block. Summer 202 represents a component configured to perform this subtraction operation. In one example, the subtraction of video blocks occurs in the pixel domain. Transform coefficient generator 204 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 204 may be configured to perform any and all combinations of the transforms included in the family of discrete trigonometric transforms. As described above, in ITU-T H.265, TBs are restricted to the following sizes 4×4, 8×8, 16×16, and 32×32. In one example, transform coefficient generator 204 may be configured to perform transformations according to arrays having sizes of 4×4, 8×8, 16×16, and 32×32. In one example, transform coefficient generator 204 may be further configured to perform transformations according to arrays having other dimensions. In particular, in some cases, it may be useful to perform transformations on rectangular arrays of difference values. In one example, transform coefficient generator 204 may be configured to perform transformations according to the following sizes of arrays: 2×2, 2×4N, 4M×2, and/or 4M×4N. In one example, a 2-dimensional (2D) M×N inverse transform may be implemented as 1-dimensional (1D) M-point inverse transform followed by a 1D N-point inverse transform. In one example, a 2D inverse transform may be implemented as a 1D N-point vertical transform followed by a 1D N-point horizontal transform. In one example, a 2D inverse transform may be implemented as a 1D N-point horizontal transform followed by a 1D N-point vertical transform. Transform coefficient generator 204 may output transform coefficients to coefficient quantization unit 206.

Coefficient quantization unit 206 may be configured to perform quantization of the transform coefficients. As described above, the degree of quantization may be modified by adjusting a quantization parameter. Coefficient quantization unit 206 may be further configured to determine quantization parameters and output QP data (e.g., data used to determine a quantization group size and/or delta QP values) that may be used by a video decoder to reconstruct a quantization parameter to perform inverse quantization during video decoding. It should be noted that in other examples, one or more additional or alternative parameters may be used to determine a level of quantization (e.g., scaling factors). The techniques described herein may be generally applicable to determining a level of quantization for transform coefficients corresponding to a component of video data based on a level of quantization for transform coefficients corresponding another component of video data.

Referring again to FIG. 6, quantized transform coefficients are output to inverse quantization/transform processing unit 208. Inverse quantization/transform processing unit 208 may be configured to apply an inverse quantization and an inverse transformation to generate reconstructed residual data. As illustrated in FIG. 6, at summer 210, reconstructed residual data may be added to a predictive video block. In this manner, an encoded video block may be reconstructed and the resulting reconstructed video block may be used to evaluate the encoding quality for a given prediction, transformation, and/or quantization. Video encoder 200 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

As described above, a video block may be coded using an intra prediction. Intra prediction processing unit 212 may be configured to select an intra prediction mode for a video block to be coded. Intra prediction processing unit 212 may be configured to evaluate a frame and/or an area thereof and determine an intra prediction mode to use to encode a current block. As illustrated in FIG. 6, intra prediction processing unit 212 outputs intra prediction data (e.g., syntax elements) to entropy encoding unit 218 and transform coefficient generator 204. As described above, a transform performed on residual data may be mode dependent. As described above, possible intra prediction modes may include planar prediction modes, DC prediction modes, and angular prediction modes. Further, in some examples, a prediction for a chroma component may be inferred from an intra prediction for a luma prediction mode.

As described above, in JVET-N1001, the reference samples for a CU coded in ISP mode, samples which may be retrieved have an increased range which is less than ideal. That is, for consistency purposes, it is desirable for reference samples fetched from previously coded CJs for the purpose of intra prediction to be the same regardless of whether ISP is used for a given CU. In one example, according to the techniques herein, it is proposed to reduce the amount of reference samples retrieved for a given partition within a CU in ISP mode by an amount equal the offset of the partition within the CU. In particular, according to the techniques herein, in one example, when a ISP split occurs, a reference sample width refW and the reference sample height refH may be derived as follows:

$$refW = nCbW * 2 + xTb0 - xTbCmp;$$
$$refH = nCbH * 2 + yTb0 - yTbCmp;$$

where,
  a sample location (xTbCmp, yTbCmp) specifies the top-left sample of the current transform block relative to the top left sample of the current picture,
  a sample location (xTb0, yTb0) specifies the top-left sample of the first transform block in the current coding unit relative to the top left sample of the current picture, and It should be noted that when the amount of reference samples retrieved for a given partition within a CU in ISP mode is reduced by an amount equal the offset of the partition within the CU, a benefit is that the predictions obtained with and without ISP are identical before the PDPC process is applied when the prediction angle is positive.

As further described above, in JVET-N1001, reference samples are smoothed for angular prediction when the slope is an integer slope and having special rules for angles that have integer slopes is less than ideal. According to the techniques herein, in one example, an intra sample prediction process may not smooth samples for angular prediction, regardless of whether a slope is an integer slope.

As described above, the position-dependent intra prediction sample filtering process in JVET-N1001 may be less than ideal as there are two modes of PDPC operation for angular modes and for DC and planar modes, the PDPC process is identical except for use of top-left reference, which may provide a less than ideal design. In one example, according to the techniques herein, there may be a single mode of PDPC operation for angular modes. Further, according to the techniques herein, a derivation of the PDPC scale is specified, such that referenced samples are always within range. In one example, according to the techniques herein, the PDPC process may be identical for DC and planar modes.

As described above, according to the derivation of filterFlag provided in JVET-N1001 different rules apply for determining the variable filterFlag when ISP is used, which is undesirable. In one example, according to the techniques herein, a unified derivation that is independent of ISP may be used.

As described above, the padding and projection process provided in JVET-N1001 is less than ideal. Table 6 provides an analysis of bounds in the sample projection process. The value x is set to (nTbH*intraPredAngle)>>5 and represents the smallest value it can take according to the following equation in JVET-N1001:

$$ref[x] =$$
$$p[-1 - refIdx][-1 - refIdx + \text{Min}((x*invAngle + 256) >> 9, nTbH)],$$

with $x = -nTbH.. - 1$

In Table 6, the value y represents the corresponding index used to address the p array in that same equation. Values which are bold and underlined are values that exceed nTbH. Such values are undesirable. For example, given nTbH=8, it is not possible to load the 8 contiguous samples from p[ ][0 . . . 7] and shuffle them according to the value of intraPredAngle to obtain to projected values of ref[ ]. Even introducing an offset and loading p[ ][o+0 . . . o+7] would not enable such shuffling.

TABLE 6

| intraPredAngle | invAngle | nTbH = 4 | | nTbH = 8 | | nTbH = 16 | |
| --- | --- | --- | --- | --- | --- | --- | --- |
| | | x | y | x | y | x | y |
| −1 | −8192 | −1 | | −1 | | −1 | |
| −2 | −4096 | −1 | | −1 | | −1 | |
| −3 | −2731 | −1 | | −1 | | −2 | 20 |
| −4 | −2048 | −1 | | −1 | | −2 | 15 |
| −6 | −1365 | −1 | | −2 | 10 | −3 | 15 |
| −8 | −1024 | −1 | | −2 | 7 | −4 | 15 |
| −10 | −819 | −2 | 5 | −3 | 9 | −5 | 15 |
| −12 | −683 | −2 | 4 | −3 | 7 | −6 | 15 |
| −14 | −585 | −2 | 4 | −4 | 8 | −7 | 15 |
| −16 | −512 | −2 | 3 | −4 | 7 | −8 | 15 |
| −18 | −455 | −3 | 4 | −5 | 8 | −9 | 15 |
| −20 | −410 | −3 | 4 | −5 | 7 | −10 | 15 |
| −23 | −356 | −3 | 3 | −6 | 7 | −12 | 16 |
| −26 | −315 | −4 | 4 | −7 | 8 | −13 | 15 |
| −29 | −282 | −4 | 3 | −8 | 8 | −15 | 16 |
| −32 | −256 | −4 | 3 | −8 | 7 | −16 | 15 |

In one example, according to the techniques herein, a projection process is provided such as to not have reference samples that are far out. The index into the reference array is thus clipped to not exceed nTbH−1. Additionally it is desirable to have the following property: 32+((x*invAngle+128)>>8) equal to (((x÷intraPredAngle)*invAngle+128)>>8) for x in 0 . . . intraPredAngle−1 such that, when projecting an edge of size 64, the process can be separated into 2 identical projections of size 32. In JVET-N1001, this property is not satisfied when intraPredAngle is equal to 29. Adding 1 bit of precision to the inverse angle derivation fixes this. Below is an example C code using SIMD that implements the proposed projection process, where the number of operations per group of 8 samples are 2 vector loads, 1 vector shuffle, and 1 vector store:

```
const int sizeDiv8 = (1 << log2Size) >> 3;
int64_t offset = offsets [angleIdx];
for (int i = 0; i < sizeDiv8; i++)
{
    const _m128i x = _mm_loadu_si128((const _m128i *)&side[1 + 8 * i]);
    const _m128i y = _mm_loadu_si128((const _m128i *)shuffle[angleIdx][i & 3]);
    _mm_storeu_si128((_m128i *)&main[offset >> 56], _mm_shuffle_epi8(x, y));
    offset <<= 8;
}
```

In particular, according to the techniques herein, in one example, the inverse angle parameter invAngle may be derived based on intraProdAngle as follows:

$$invAngle = \text{Round}\left(\frac{512*32}{intraPredAngle}\right)$$

That is, for example, according to the techniques herein, in one example, an intra sample prediction process may be performed according to one or more of the following processes:

Directional Intra Prediction Mode Process
  Inputs to this process are:
  the intra prediction mode predModeIntra,
  a variable refIdx specifying the intra prediction reference line index,
  a variable nTbW specifying the transform block width,
  a variable nTbH specifying the transform block height,
  a variable refW specifying the reference samples width,
  a variable refH specifying the reference samples height,
  a variable nCbW specifying the coding block width,
  a variable nCbH specifying the coding block height,
  a variable cIdx specifying the colour component of the current block,
  the neighbouring samples p[x][y], with x=−1−refIdx, y=−1−refIdx . . . refH−1 and x=−refIdx . . . refW−1, y=−1−refIdx.
  Outputs of this process are the predicted samples predSamples[x][y], with x=0 . . . nTbW−1, y=0 . . . nTbH−1.
  The variable nTbS is set equal to (Log 2(nTbW)+Log 2(nTbH))>>1.
  The variable filterFlag is derived as follows:
  The variable minDistVerHor is set equal to Min(Abs (predModeIntra−50), Abs(predModeIntra−18)).
  The variable intraHorVerDistThres[nTbS] is specified in Table 1.
  If minDistVerHor is greater than intraHorVerDistThres [nTbS], filterFlag is set equal to 1.
  Otherwise, filterFlag is set equal to 0.
  Alternatively, the variable filterFlag is derived as follows:
  The variable minDistVerHor is set equal to Min(Abs (prodModeIntra−50), Abs(predModeIntra−18)).
  The variable intraHorVerDietThres[nTbS] is specified in Table 1
  If refIdx is equal to 0, IntraSubPartitionsSplitType is equal to ISP_NO_SPLIT, and minDistVerHor is greater than intraHorVerDistThres[nTbS], filterFlag is set equal to 1.
  Otherwise, filterFlag is set equal to 0.
  Table 2 specifies the mapping table between a predModeIntra and the angle parameter intraPredAngle.

The inverse angle parameter invAngle is derived based on intraPredAngle as follows:

$$invAngle = \text{Round}\left(\frac{512*32}{intraPredAngle}\right)$$

The interpolation filter coefficients fC[phase][j] and fG[phase][j] with phase=0..31 and j=0 . . . 3 specified in Table 3.

The values of the prediction samples predSamples[x][y], with x=0 . . . nTbW−1, y=0 . . . nTbH−1 are derived as follows:

If predModeIntra is greater than or equal to 34, the following ordered steps apply:
1. The reference sample array ref[x] is specified as follows:
   The following applies:

$$ref[x] = p[-1 - refIdx + x][-1 - refIdx], \text{ with } x = 0..nTbW + refIdx + 1$$

If intraPredAngle is less than 0, the main reference sample array is extended as follows:

$$ref[x] = p[-1 - refIdx][-1 - refIdx + ((x*invAngle + 256) >> 9, nTbH)],$$
$$\text{with } x = -nTbH.. - 1$$

Otherwise, $$ref[x] = p[-1 - refIdx + x][-1 - refIdx],$$
$$\text{with } x = nTbW + 2 + refIdx..refW + refIdx$$

The additional samples refi refW+refIdx+x1 with x=1 . . . (Max(1, nTbW/nTbH)*refIdx+2) are derived as follows:

$$ref[refW + refIdx + x] = p[-1 + refW][-1 - refIdx]$$

2. The values of the prediction samples predSamples [x][y], with x=0 . . . nTbW−1, y=0 . . . nTbH−1 are derived as follows:
   The index variable iIdx and the multiplication factor iFact are derived as follows:

$$iIdx = (((y + 1 + refIdx)*intraPredAngle) >> 5) + refIdx$$
$$iFact = ((y + 1 + refIdx)*intraPredAngle) \& 31$$

If cIdx is equal to 0, the following applies:
   The interpolation filter coefficients fT[j] with j=0 . . . 3 are derived as follows:

$$fT[j] = filterFlag ? fG[iFact][j] : fC[iFact][j]$$

The value of the prediction samples predSamples [x][y] is derived as follows:

$$predSamples[x][y] = Clip1Y\left(\left(\left(\sum_{i=0}^{3} fT[i]*ref[x + iIdx + i]\right) + 32\right) >> 6\right)$$

Otherwise (cIdx is not equal to 0), depending on the value of iFact, the following applies:
   If iFact is not equal to 0, the value of the prediction samples predSamples[x][y] is derived as follows:

$$predSamples[x][y] =$$
$$((32 - iFact)*ref[x + iIdx + 1] + iFact*ref[x + iIdx + 2] + 16) >> 5$$

Otherwise, the value of the prediction samples predSamples[x][y] is derived as follows:

$$predSamples[x][y] = ref[x + iIdx + 1]$$

Otherwise (predModeIntra is less than 34), the following ordered steps apply:
1. The reference sample array ref[x] is specified as follows:
   The following applies:

$$ref[x] = p[-1 - refIdx][-1 - refIdx + x],$$
$$\text{with}$$
$$x = 0 \ldots nTbH + refIdx + 1$$

If intraPredAngle is les than 0, the main reference sample array is extended as follows:

$$ref[x] = p[-1 - refIdx + ((x*invAngle + 256) \gg 9, nTbW)][-1 - refIdx],$$
$$\text{with}$$
$$x = -nTbW \ldots -1$$

Otherwise, $$ref[x] = p[-1 - refIdx][-1 - refIdx + x],$$
$$\text{with}$$
$$x = nTbH + 2 + refIdx \ldots refH + refIdx$$

The additional samples ref[refH+refIdx+x] with x=1 . . . (Max(1, nTbW/nTbH)*refIdx+2) are derived as follows:

$$ref[refH + refIdx + x] = p[-1 + refH][-1 - refIdx]$$

2. The values of the prediction samples predSamples [x][y], with x=0 . . . nTbW−1, y=0 . . . nTbH−1 are derived as follows:

The index variable iIdx and the multiplication factor iFact are derived as follows:

$$iIdx = (((x + 1 + refIdx) * intraPredAngle) \gg 5) + refIdx$$

$$iFact = ((x + 1 + refIdx) * intraPredAngle) \& 31$$

If cIdx is equal to 0, the following applies:
  The interpolation filter coefficients fT[j] with j=0 . . . 3 are derived as follows:

$$fT[j] = filterFlag?\, fG[iFact][j]:\, fC[iFact][j]$$

The value of the prediction samples predSamples [x][y] is derived as follows:

$$predSamples[x][y] = Clip1Y\left(\left(\left(\sum\nolimits_{i=0}^{3} fT[i] * ref[y + iIdx + i]\right) + 32\right) \gg 6\right)$$

Otherwise (cIdx is not equal to 0), depending on the value of iFact, the following applies:
  If iFact is not equal to 0, the value of the prediction samples predSamples[x][y] is derived as follows:

$$predSamples[x][y] =$$
$$((32 - iFact) * ref[y + iIdx + 1] + iFact * ref[y + iIdx + 2] + 16) \gg 5$$

Otherwise, the value of the prediction samples predSamplea[x][y] is derived as follows:

$$predSamples[x][y] = ref[y + iIdx + 1]$$

Decoding Process for Intra Blocks
  Inputs to this process are:
  a sample location (xTb0, yTb0) specifying the top-left sample of the current transform block relative to the top-left sample of the current picture.
  a variable nTbW specifying the width of the current transform block,
  a variable nTbH specifying the height of the current transform block,
  a variable predModeIntra specifying the intra prediction mode,
  a variable cIdx specifying the colour component of the current block.
  Output of this process is a modified reconstructed picture before in-loop filtering.
  The maximum transform block size maxTbSize is derived as follows:

$$maxTbSize = (cIdx == 0)?\, MaxTbSizeY:\, MaxTbSizeY / 2$$

The luma sample location is derived as follows:

$$(xTbY, yTbY) = (cIdx == 0)?(xTb0, yTb0): (xTb0 * 2, yTb0 * 2)$$

Depending on maxTbSize, the following applies:
If IntraSubPartitionsSplitType is equal to NO_ISP_SPLIT and nTbW is greater than maxTbSize or nTbH is greater than maxThSize, the following ordered stops apply.
  1. The variables newTbW and newTbH are derived as follows:

$$newTbW = (nTbW > maxTbSize)\, ?\, (nTbW/2):\, nTbW$$
$$newTbW = (nTbH > maxTbSize)\, ?\, (nTbH/2):\, nTbH$$

2. The general decoding process for intra blocks as specified in this clause is invoked with the location (xTb0, yTb0), the transform block width nTbW set equal to newTbW and the height nTbH set equal to newTbH, the intra prediction mode predModeIntra. and the variable cIdx as inputs, and the output is a modified reconstructed picture before in-loop filtering.
  3. If nTbW is greater than maxTbSize, the general decoding process for intra blocks as specified in this clause is invoked with the location (xTb0, yTb0) set equal to (xTb0+newTbW, yTb0), the transform block width nTbW set equal to newTbW and the height nTbH set equal to newTbH, the intra prediction mode predModeIntra, and the variable cIdx as inputs, and the output is a modified reconstructed picture before in-loop filtering.
  4. If nTbH is greater than maxTbSize, the general decoding process for intra blocks as specified in this clause is invoked with the location (xTb0, yTb0) set equal to (xTb0, yTb0+newTbH), the transform block width nTbW set equal to newTbW and the height nTbH set equal to newTbH, the intra prediction mode predModeIntra, and the variable cIdx as inputs, and the output is a modified reconstructed picture before in-loop filtering.
  5. If nTbW is greater than maxTbSize and nTbH is greater than maxTbSize, the general decoding process for intra blocks as specified in this clause is invoked with the location (xTb0, yTb0) set equal to (xTb0+newTbW, yTb0+newTbH), the transform block width nTbW set equal to newTbW and the height nTbH set equal to newTbH, the intra prediction mode predModeIntra, and the variable cIdx as inputs, and the output is a modified reconstructed picture before in-loop filtering.
Otherwise, the following ordered steps apply:
  The variables nW, nH, numPartsX and numPartsY are derived as follows:
  nW=IntraSubPartitionsSplitType==ISP_VER_SPLIT ? nTbW/NumIntraSubPartitions:nTbW
  nH=IntraSubPartitionsSplit.Type==ISP_HOR_SPLIT ? nTbH/NumIntraSubPartitions:nThH
  numPartsX=IntraSubPartitionsSplitType ISP_VER_SPLIT ? NumIntraSubPartitions:1
  numPartsY=IntraSubPartitionsSplitType==ISP_HOR_SPLIT ? NumIntraSubPartitions:1

For xPartIdx=0 ... numPartsX−1 and yPartIdx=0 ... numPartsY−1, the following applies:
1. The intra sample prediction process as specified below is invoked with the location (xTbCmp, yTbCmp) set equal to (xTb0+nW*xPartIdx, yTb0+nH*yPartIdx), the location (xTb0, yTb0), the intra prediction mode predModeIntra, the transform block width nTbW and height nTbH set equal to nW and nH, the coding block width nCbW and height nCbH set equal to nTbW and nTbH, and the variable cIdx as inputs, and the output is an (nTbW)×(nTbH) array predSamples.

Intra Sample Prediction Process

Inputs to this process are:
a sample location (xTbCmp, yTbCmp) specifying the top-left sample of the current transform block relative to the top-left sample of the current picture,
a sample location (xTb0, yTb0) specifying the top-left sample of the first transform block in the current coding unit relative to the top left sample of the current picture,
a variable predModeIntra specifying the intra prediction mode,
a variable nTbW specifying the transform block width,
a variable nTbH specifying the transform block height,
a variable nCbW specifying the coding block width,
a variable nCbH specifying the coding block height,
a variable cIdx specifying the colour component of the current block.

Outputs of this process are the predicted samples predSamples[x][y], with x=0 ... nTbW−1, y=0 ... nTbH−1.

The predicted samples predSamples[x][y] are derived as follows:
If intra_mip_flag[xTbComp][yTbComp] is equal to 1 and cIdx is equal to 0, the matrix-based intra sample prediction process is invoked with the location (xTbCmp, yTbCmp), the location (xTb0, yTb0), the intra prediction mode predModeIntra, the transform block width nTbW and height nTbH as inputs, and the output is predSamples.

Otherwise, the general (non-mip) intra sample prediction process as specified below is invoked with the location (xTbCmp, yTbCmp), the intra prediction mode predModeIntra, the transform block width nTbW and height nTbH, the coding block width nCbW and height nCbH, and the variable cIdx as inputs, and the output is predSamples.

General (Non-Mip) Intra Sample Prediction Process

Inputs to this process are:
a sample location (xTbCmp, yTbCmp) specifying the top-left sample of the current transform block relative to the top-left sample of the current picture.
a sample location (xTb0, yTb0) specifying the top-left sample of the first transform block in the current coding unit relative to the top-left sample of the current picture,
a variable predModeIntra specifying the intra prediction mode,
a variable nTbW specifying the transform block width,
a variable nTbH specifying the transform block height,
a variable nCbW specifying the coding block width,
a variable nCbH specifying the coding block height,
a variable cIdx specifying the colour component of the current block.

Outputs of this process are the predicted samples predSamples[x][y], with x=0 ... nTbW−1, y=0 ... nTbH−1.

The variables refW and refH are derived as follows:
If IntraSubPartitionsSplitType is equal to ISP_NO_SPLIT or cIdx is not equal to 0, the following applies:

$$refW = nTbW * 2$$
$$refH = nTbH * 2$$

Otherwise (IntraSubPartitionsSplitType is not equal to ISP_NO_SPLIT and cIdx is equal to 0), the following applies:

$$refW = nCbW * 2 + xTb0 - xTbCmp$$
$$refH = nCbH * 2 + yTb0 - yTbCmp$$
$$refIdx = (cIdx == 0) ? IntraLumaRefLineIdx[xTbCmp][yTbCmp]: 0$$

The wide angle intra prediction mode mapping process is invoked with predModeIntra, nTbW, nTbH and cIdx as inputs, and the modified predModeIntra as output.

For the generation of the reference samples p[x][y] with x=−1−refIdx, y=−1−refIdx ... refH−1 and x=−refIdx ... refW−1, y=−1−refIdx, the following ordered steps apply:
1. The reference sample availability marking process is invoked with the sample location (xTbCmp, yTbCmp), the intra prediction reference line index refIdx, the reference sample width refW, the reference sample height refH, the colour component index cIdx as inputs, and the reference samples refUnfilt[x][y] with x=−1−refIdx, y=−1−refIdx ... refH−1 and x=−refIdx ... refW−1, y=−1−refIdx as output.
2. When at least one sample refUnfilt[x][y] with x=−1−refIdx, y=−1−refIdx ... refH−1 and x=−refIdx ... refW−1, y=−1−refIdx is marked as "not available for intra prediction", the reference sample substitution process is invoked with the intra prediction reference line index refIdx, the reference sample width refW, the reference sample height refH, the reference samples refUnfilt[x][y] with x=−1−refIdx, y=−1−refIdx ... refH−1 and x=−refIdx ... refW−1, y=−1−refIdx, and the colour component index cIdx as inputs, and the modified reference samples p[x][y] with x=−1−refIdx, y=−1−refIdx ... refH−1 and x=−refIdx ... refW−1, y=−1−refIdx as output.
3. The reference sample filtering process as specified below is invoked with the intra prediction reference line index refIdx, the transform block width nTbW and height nTbH, the reference sample width refW, the reference sample height refit, the unfiltered samples refUnfilt[x][y] with x=−1−refIdx, y=−1−refIdx ... refH−1 and x=−refIdx ... refW−1, y=−1−refIdx. and the colour component index cIdx as inputs, and the reference samples p[x If y] with x=−1−refIdx, y=−1−refIdx ... refH−1 and x=−refIdx ... refW−1, y=−1−refIdx as output.

The intra sample prediction process according to predModeIntra applies as follows:
If predModeIntra is equal to INTRA_PLANAR, the corresponding intra prediction mode process is invoked with the transform block width nTbW, and the transform block height nTbH, and the reference sample array p as inputs, and the output is the predicted sample array predSamples.

Otherwise, if predModeIntra is equal to INTRA_DC, the corresponding intra prediction mode process is invoked with the transform block width nTbW, the transform block height nTbH, the intra prediction reference line index refIdx, and the reference sample array p as inputs, and the output is the predicted sample array predSamples.

Otherwise, if predModeIntra is equal to INTRA_LT_CCLM, INTRA_L_CCLM or INTRA_T_CCLM, the corresponding intra prediction mode process is invoked with the intra prediction mode predModeIntra, the sample location (xTbC, yTbC) set equal to (xTbCmp, yTbCmp), the transform block width nTbW and height nTbH, and the reference sample array p as inputs, and the output is the predicted sample array predSamples.

Otherwise, the corresponding directional intra prediction mode process specified above is invoked with the intra prediction mode predModeIntra, the intra prediction reference line index refIdx, the transform block width nTbW, the transform block height nTbH, the reference sample width refW, the reference sample height refH, the coding block width nCbW and height nCbH, the colour component index cIdx, and the reference sample array p as inputs, and the predicted sample array predSamples as outputs.

When all of the following conditions are true, the position-dependent prediction sample filtering process specified below is invoked with the intra prediction mode predModeIntra, the transform block width nTbW, the transform block height nTbH, the predicted samples predSamples[x][y], with x=0 . . . nTbW−1, y=0 . . . nTbH−1, the reference sample width refW, the reference sample height refH, the reference samples p[x][y], with x=−1, y=−1 . . . refH−1 and x=0 . . . refW−1, y=−1m and the colour component index cIdx as inputs, and the output is the modified predicted sample array predSamples:

IntraSubPartitionsSplitType is equal to ISP_NO_SPLIT or cIdx is not equal to 0
    refIdx is equal to 0 or cIdx is not equal to 0
    BdpcmFlag[xTbCmp][xTbCmp] is equal to 0
    predModeIntra is less than or equal to INTRA_ANGULAR18 or greater than or equal to INTRA_ANGULAR50

Reference Sample Filtering Process
Reference Sample Filtering Process
  Inputs to this process are:
  a variable refIdx specifying the intra prediction reference line index,
  a variable nTbW specifying the transform block width,
  a variable nTbH specifying the transform block height,
  a variable refW specifying the reference samples width,
  a variable refH specifying the reference samples height,
  the (unfiltered) neighbouring samples refUnfilt[x][y], with x=−1−refIdx, y=−1−refIdx . . . refH−1 and x=−refIdx . . . refW−1, y=−1−refIdx,
  a variable cIdx specifying the colour component of the current block.
  Outputs of this process are the reference samples p[x][y], with x=−1−refIdx, y=−1−refIdx . . . refH−1 and x=−refIdx . . . refW−1, y=−1−refIdx.
  The variable filterFlag is derived as follows:
  If all of the following conditions are true, filterFlag is set equal to 1:
    nTbW*nTbH is greater than 32
    cIdx is equal to 0

IntraSubPartitionsSplitType is equal to ISP_NO_SPLIT
    predModeIntra is equal to INTRA_PLANAR
  Otherwise, filterFlag is set equal to 0.
  For the derivation of the reference samples p[x][y] the following applies:
    If filterFlag is equal to 1, the filtered sample values p[x][y] with x=−1, y=−1 . . . refH−1 and x=0 . . . refW−1, y=−1 are derived as follows:

$$p[-1][-1] = refUnfilt[-1][-1]$$

$$p[-1][y] = (refUnfilt[-1][y+1] + 2*refUnfilt[-1][y] + refUnfilt[-1][y-1] + 2) \gg 2$$

$$\text{for } y = 0 \ldots nTbH$$

$$p[-1][y] = refUnfilt[-1][y] \text{ for } y = nTbH + 1 \ldots refH - 1$$

$$p[x][-1] = (refUnfilt[x-1][-1] + 2*refUnfilt[x][-1] + refUnfilt[x+1][-1] + 2) \gg 2$$

$$\text{for } x = 0 \ldots nTbH$$

$$p[x][-1] = refUnfilt[x][-1] \text{ for } y = nTbW + 1 \ldots refH - 1$$

Otherwise, the reference samples values $p[x][y]$ are set equal to the unfiltered sample values $refUnfilt[x][y]$ $$\text{with } x = -1 - refIdx,$$

$$y = -1 - refIdx \ldots refH - 1 \text{ and } x = -refIdx \ldots refW - 1,$$

$$y = -1 - refIdx.$$

Position-Dependent Intra Prediction Sample Filtering Process
  Inputs to this process are:
  the intra prediction mode predModeIntra,
  a variable nTbW specifying the transform block width.
  a variable nTbH specifying the transform block height,
  a variable refW specifying the reference samples width,
  a variable refH specifying the reference samples height,
  the predicted samples prodSamples[x][y], with x=0 . . . nTbW−1, y=0 . . . nTbH−1,
  the neighbouring samples p[x][y], with x=−1, y=−1 . . . refH−1 and x=0 . . . refW−1, y=−1,
  a variable cIdx specifying the colour component of the current block.
  Outputs of this process are the modified predicted samples predSamples[x][y] with x=0 . . . nTbW−1, y=0 . . . nTbH−1.
  Depending on the value of cIdx, the function clip1Cmp is set as follows:
    If cIdx is equal to 0, clip1Cmp is set equal to $Clip1_Y$.
    Otherwise, clip1Cmp is set equal to $Clip1_C$.
  The variable nScale is set to ((Log 2(nTbW)+Log 2(nTbH)−2)>>2).
  If predModeIntra is greater than INTRA_ANGULAR50, the variable nScale is further set to Min(2, Log 2(nTbH)−Floor(Log 2(3*invAngle−2))+7), using invAngle as specified above.
  If predModeIntra is less than INTRA_ANGULAR18 and not equal to either INTRA_PLANAR or INTRA_DC, the variable nScale is further set to Min(2, Log 2(nTbW)−Floor (Log 2(3*invAngle−2))+7), using invAngle as specified above.
  It should be noted that in one example, the variable nScale is further set to Min(2, Log 2(nTbH)−Floor(Log 2(3*invAngle−2))+8) and the variable nScale is further set to Min(2, Log 2(nTbW)−Floor(Log 2(3*invAngle−2))+8), if precision of inverse angle is increased.

The reference sample arrays mainRef[x] and sideRef[y], with x=0 . . . refW−1 and y=0 . . . refH−1 are derived as follows:

$$mainRef[x] = p[x][-1]$$

$$sideRef[y] = p[-1][y]$$

The variables refL[x][y], refT[x][y], wT[y], wL[x] and wTL[x][y] with x=0 . . . nTbW−1, y=0 . . . nTbH−1 are derived as follows:
If predModeIntra is equal to INTRA_PLANAR or INTRA_DC, the following applies:

$$refL[x][y] = p[-1][y]$$

$$refT[x][y] = p[x][-1]$$

$$wT[y] = 32 \gg ((y \ll 1) \gg nScale)$$

$$wL[x] = 32 \gg ((x \ll 1) \gg nScale)$$

$$wTL[x][y] = 0$$

Otherwise, if predModeIntra is equal to INTRA_ANGULAR18 or INTRA_ANGULAR50, the following applies:

$$refL[x][y] = p[-1][y]$$

$$refT[x][y] = p[x][-1]$$

$$wT[y] = (predModeIntra == INTRA\_ANGULAR18) \;?$$

$$32 \gg ((y \ll 1) \gg nScale): 0$$

$$wL[x] = (predModeIntra == INTRA\_ANGULAR50) \;?$$

$$32 \gg ((x \ll 1) \gg nScale): 0$$

$$wTL[x][y] = (predModeIntra == INTRA\_ANGULAR18) \;? \; wT[y] : wL[x].$$

Otherwise, if predModeIntra is less than INTRA_ANGULAR18, and nScale is equal to or greater than 0, the following ordered steps apply:
1. The variables dX[x][y] and dX[x][y] are derived as follows using invAngle as specified above depending on intraPredMode:

$$dXPos[y] = ((y + 1) * invAngle + 128) \gg 8$$

OR ((x+1)invAngle+256)>>9, if precision of inverse angle is increased.

$$dX[x][y] = x + DXInt[y]$$

2. The variables refL[x][y], refT[x][y], wT[y], wL[x] and wTL[x][y] are derived as follows:

$$refL[x][y] = 0$$

$$refT[x][y] = (y < (3 \ll nScale)) \;? \; mainRef[dX[x][y]] : 0$$

$$wT[y] = 32 \gg ((y \ll 1) \gg nScale)$$

$$wL[x] = 0$$

$$wTL[x][y] = 0$$

Otherwise, if predModeIntra is greater than INTRA_ANGULAR50, and nScale is equal to or greater than 0, the following ordered steps apply:
1. The variables dYPos[x], dYFrac[x], dYInt[x] and dY[x][y] are derived as follows using invAngle as specified above depending on intraPredMode:

$$dyInt[x] = ((x + 1) * invAngle + 128) \gg 8$$

OR ((x+1)*invAngle+256)>>9, if precision of inverse angle is increased.

$$dY[x][y] = y + dYInt[x]$$

2. The variables refL[x][y], refT[x][y], wT[y], wL[x] and wTL[x][y] are derived as follows:

$$refL[x][y] = (x < (3 \ll nScale)) \;? \; sideRef[dY[x][y]] : 0$$

$$refT[x][y] = 0$$

$$wT[y] = 0$$

$$wL[x] = 32 \gg ((x \ll 1) \gg nScale)$$

$$wTL[x][y] = 0$$

Otherwise, refL[x][y], refT[x][y], wT[y], wL[x] and wTL[x][y] are all set equal to 0.

The values of the modified predicted samples predSamples[x][y], with x=0 . . . nTbW−1, y=0 . . . nTbH−1 are derived as follows:

$$predSamples[x][y] = clip1Cmp((refL[x][y] *$$

$$wL[x] + refT[x][y] * wT[y] - p[-1][-1] * wTL[x][y] +$$

$$(64 - wL[x] - wT[y] + wTL[x][y]) * predSamples[x][y] + 32) \gg 6)$$

In this manner, video encoder 200 represents an example of a device configured to set a value of a scale variable based on an inverse angle provided by an intra prediction mode, and perform a position-dependent intra prediction sample filtering process based on the value of a scale variable.

Inter prediction processing unit 214 may be configured to perform inter prediction coding for a current video block. Inter prediction processing unit 214 may be configured to receive source video blocks and calculate a motion vector for PUs of a video block. A motion vector may indicate the displacement of a PU (or similar coding structure) of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 214 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 214 may be configured to perform motion vector prediction, as described above. Inter prediction processing unit 214 may be configured to generate a predictive block using the motion prediction data. For example, inter prediction processing unit 214 may locate a predictive video block within a frame buffer (not shown in FIG. 6). It should be noted that inter prediction processing unit 214 may further be configured to apply one or more interpolation filters to a reconstructed residual block to calculate sub-integer pixel values for use in motion estimation. Inter prediction processing unit 214 may output motion prediction data for a calculated motion vector to entropy encoding unit 218. As illustrated in FIG. 6, inter prediction processing unit 214 may receive reconstructed video block via filter unit 216.

Referring again to FIG. 6, filter unit 216 receives reconstructed video blocks and coding parameters and outputs modified reconstructed video data. Filter unit 216 may be configured to perform deblocking, Sample Adaptive Offset (SAO) filtering, Adaptively Loop Filtering (ALF), etc. SAO filtering is a non-linear amplitude mapping that may be used to improve reconstruction by adding an offset to reconstructed video data. It should be noted that as illustrated in FIG. 5, intra prediction processing unit 212 and inter prediction processing unit 214 may receive modified reconstructed video block via filter unit 216. Entropy encoding unit 218 receives quantized transform coefficients and predictive syntax data (i.e., intra prediction data and motion prediction data). Entropy encoding unit 218 may be configured to perform entropy encoding according to one or more of the techniques described herein.

Figure 7:
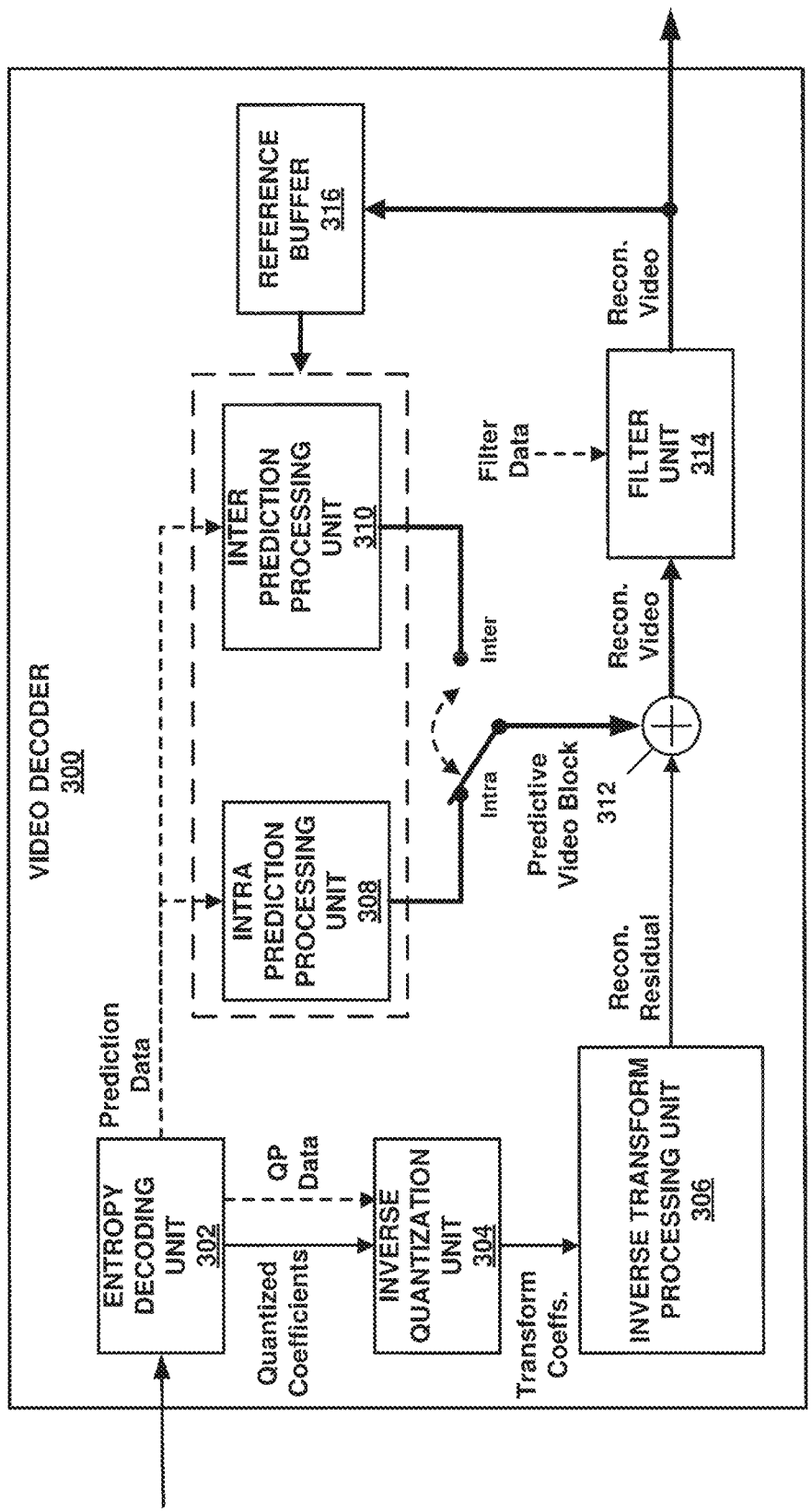
FIG. 7 is a block diagram illustrating an example of a video decoder that may be configured to decode video data according to one or more techniques of this disclosure.

FIG. 7 is a block diagram illustrating an example of a video decoder that may be configured to decode video data according to one or more techniques of this disclosure. In one example, video decoder 300 may be configured to reconstruct video data based on one or more of the techniques described above. That is, video decoder 300 may operate in a reciprocal manner to video encoder 200 described above. Video decoder 300 may be configured to perform intra prediction decoding and inter prediction decoding and, as such, may be referred to as a hybrid decoder. In the example illustrated in FIG. 7 video decoder 300 includes an entropy decoding unit 302, inverse quantization unit 304, inverse transformation processing unit 306, intra prediction processing unit 308, inter prediction processing unit 310, summer 312, filter unit 314, and reference buffer 316. Video decoder 300 may be configured to decode video data in a manner consistent with a video encoding system, which may implement one or more aspects of a video coding standard. It should be noted that although example video decoder 300 is illustrated as having distinct functional blocks, such an illustration is for descriptive purposes and does not limit video decoder 300 and/or sub-components thereof to a particular hardware or software architecture. Functions of video decoder 300 may be realized using any combination of hardware, firmware, and/or software implementations.

As illustrated in FIG. 7, entropy decoding unit 302 receives an entropy encoded bitstream. Entropy decoding unit 302 may be configured to decode quantized syntax elements and quantized coefficients from the bitstream according to a process reciprocal to an entropy encoding process. Entropy decoding unit 302 may be configured to perform entropy decoding according any of the entropy coding techniques described above. Entropy decoding unit 302 may parse an encoded bitstream in a manner consistent with a video coding standard. Video decoder 300 may be configured to parse an encoded bitstream where the encoded bitstream is generated based on the techniques described above.

Referring again to FIG. 7, inverse quantization unit 304 receives quantized transform coefficients (i.e., level values) and quantization parameter data from entropy decoding unit 302. Quantization parameter data may include any and all combinations of delta QP values and/or quantization group size values and the like described above. Video decoder 300 and/or inverse quantization unit 304 may be configured to determine QP values used for inverse quantization based on values signaled by a video encoder and/or through video properties and/or coding parameters. That is, inverse quantization unit 304 may operate in a reciprocal manner to coefficient quantization unit 206 described above. For example, inverse quantization unit 304 may be configured to infer predetermined values), allowed quantization group sizes, derive quantization parameters, and the like, according to the techniques described above. Inverse quantization unit 304 may be configured to apply an inverse quantization. Inverse transform processing unit 306 may be configured to perform an inverse transformation to generate reconstructed residual data. The techniques respectively performed by inverse quantization unit 304 and inverse transform processing unit 306 may be similar to techniques performed by inverse quantization/transform processing unit 208 described above. Inverse transform processing unit 306 may be configured to apply an inverse DCT, an inverse DST, an inverse integer transform, Non-Separable Secondary Transform (NSST), or a conceptually similar inverse transform processes to the transform coefficients in order to produce residual blocks in the pixel domain. Further, as described above, whether a particular transform (or type of particular transform) is performed may be dependent on an intra prediction mode. As illustrated in FIG. 7, reconstructed residual data may be provided to summer 312. Summer 312 may add reconstructed residual data to a predictive video block and generate reconstructed video data. A predictive video block may be determined according to a predictive video technique (i.e., intra prediction and inter frame prediction).

Intra prediction processing unit 308 may be configured to receive intra prediction syntax elements and retrieve a predictive video block from reference buffer 316. Reference buffer 316 may include a memory device configured to store one or more frames of video data. Intra prediction syntax elements may identify an intra prediction mode, such as the intra prediction modes described above. In one example, intra prediction processing unit 308 may reconstruct a video block using according to one or more of the intra prediction coding techniques described herein. Inter prediction processing unit 310 may receive inter prediction syntax elements and generate motion vectors to identify a prediction block in one or more reference frames stored in reference buffer 316. Inter prediction processing unit 310 may produce motion compensated blocks, possibly performing interpolation based on interpolation filters. Identifiers for interpolation filters to be used for motion estimation with sub-pixel precision may be included in the syntax elements. Inter prediction processing unit 310 may use interpolation filters to calculate interpolated values for sub-integer pixels of a reference block. Filter unit 314 may be configured to perform filtering on reconstructed video data. For example, filter unit 314 may be configured to perform deblocking and/or SAO filtering, as described above with respect to filter unit 216. Further, it should be noted that in some examples, filter unit 314 may be configured to perform proprietary discretionary filter (e.g., visual enhancements). As illustrated in FIG. 7, a reconstructed video block may be output by video decoder 300. In this manner, video decoder 300 represents an example of a device configured to set a value of a scale variable based on an inverse angle provided by an intra prediction mode, and perform a position-dependent intra prediction sample filtering process based on the value of a scale variable.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

SUMMARY

In one example, a method of coding of video data, the method comprising: setting a value of a scale variable based on an inverse angle provided by an intra prediction mode; and performing a position-dependent intra prediction sample filtering process based on the value of a scale variable.

In one example, the method, wherein setting a value of a scale variable based on an inverse angle provided by an intra prediction mode includes setting the value of the scale variable based on whether the intra prediction mode is greater than a specified mode.

In one example, the method, wherein an inverse angle provided by an intra prediction mode is determined according to one or more techniques described herein.

In one example, a device for coding video data, the device comprising one or more processors configured to perform any and all combinations of the steps.

In one example, the device, wherein the device includes a video encoder.

In one example, the device, wherein the device includes a video decoder.

In one example, a system comprising: the device includes a video encoder; and the device includes a video decoder.

In one example, an apparatus for coding video data, the apparatus comprising means for performing any and all combinations of the steps.

In one example, a non-transitory computer-readable storage medium comprising instructions stored thereon that, when executed, cause one or more processors of a device for coding video data to perform any and all combinations of the steps.

In one example, a method of coding video data, the method comprising: deriving an intra prediction angle parameter; deriving an inverse angle parameter based on the intra prediction angle parameter; for a prediction mode included in a defined set of prediction modes, setting a value of a scale variable based on the derived inverse angle; and performing a position-dependent intra prediction sample filtering process using the value of a scale variable.

In one example, the method, wherein the defined set of prediction modes includes prediction modes in range of 2 to 17 and prediction modes in the range of 51 to 80.

In one example, the method, wherein deriving an inverse angle parameter based on an intra prediction angle parameter includes dividing 16,384 by the intra prediction angle parameter.

In one example, the method, wherein setting the value of the scale variable based on the derived inverse angle includes setting the value of the scale variable to 2 unless the derived inverse angle is greater than a threshold value corresponding to a transform block dimension.

In one example, the method, wherein determining whether the derived inverse angle is greater than a threshold value includes performing the following calculation: Floor (Log 2(3*invAngle−2)), where invAngle is the derived inverse angle.

In one example, the method, further comprising for a prediction mode not included in the defined set of prediction modes, setting the value of the scale variable based on a transform block height dimension and width dimension.

In one example, a device comprising one or more processors configured to: derive an intra prediction angle parameter; derive an inverse angle parameter based on the intra prediction angle parameter; for a defined set of prediction modes, set a value of a scale variable based on the derived inverse angle; and perform a position-dependent intra prediction sample filtering process using the value of a scale variable.

In one example, the device, wherein the defined set of prediction modes includes prediction modes in range of 2 to 17 and prediction modes in the range of 51 to 80.

In one example, the device, wherein deriving an inverse angle parameter based on an intra prediction angle parameter includes dividing 16,384 by the intra prediction angle parameter.

In one example, the device, wherein setting the value of the scale variable based on the derived inverse angle includes setting the value of the scale variable to 2 unless the derived inverse angle is greater than a threshold value corresponding to a transform block dimension.

In one example, the device, wherein determining whether the derived inverse angle is greater than a threshold value includes performing the following calculation: Floor(Log 2(3*invAngle−2)), where invAngle is the derived inverse angle.

In one example, the device, further comprising for a prediction mode not included in the defined set of prediction modes, setting the value of the scale variable based on a transform block height dimension and width dimension.

In one example, the device, wherein the device is a video decoder.

CROSS REFERENCE

This Nonprovisional application claims priority under 35 U.S.C. § 119 on provisional Application No. 62/865,661 on Jun. 24, 2019, No. 62/868,276 on Jun. 28, 2019, the entire contents of which are hereby incorporated by reference.

The invention claimed is:

1. A method of coding of video data, the method comprising:
receiving an intra prediction mode;
receiving an intra prediction reference line index, refIdx;
receiving a transform block width, nTbW;
receiving a transform block height, nTbH;
receiving neighboring samples, p[x][y];
deriving an intra prediction angle parameter specified by the intra prediction mode based on a mapping table;
deriving an inverse angle parameter, invAngle, based on dividing 16,384 by the intra prediction angle parameter;
in response to determining that the intra prediction mode is greater than or equal to 34 and the intra prediction angle parameter is less than 0, extending a reference sample array, ref[], as follows:

$$ref[x] =$$
$$p[-1 - refIdx][-1 - refIdx + \text{Min}((x * invAngle + 256) \gg 9, nTbH)],$$
$$\text{with } x = -nTbH \text{ to } -1; \text{ and}$$

deriving a value of prediction samples, predSamples[x][y], based on the reference sample array.

2. A device comprising one or more processors configured to:
receive an intra prediction mode;
receive an intra prediction reference line index, refIdx;
receive a transform block width, nTbW;
receive a transform block height, nTbH;
receive neighboring samples, p[x][y];
derive an intra prediction angle parameter specified by the intra prediction mode based on a mapping table;
derive an inverse angle parameter, invAngle, based on dividing 16,384 by the intra prediction angle parameter;
in response to determining that the intra prediction mode is greater than or equal to 34 and the intra prediction angle parameter is less than 0, extending a reference sample array, ref[], as follows:

ref[x]=p[−1−refIdx][−1−refIdx+Min((x*invAngle+ 256)>>9,nTbH)], with x=−nTbH to −1; and derive a value of prediction samples, predSamples[x][y], based on the reference sample array.

3. The device of claim 2, wherein the device is a video decoder.

* * * * *